(12) United States Patent
Valiveti et al.

(10) Patent No.: US 8,934,479 B2
(45) Date of Patent: Jan. 13, 2015

(54) SUPER OPTICAL CHANNEL TRANSPORT UNIT SIGNAL SUPPORTED BY MULTIPLE WAVELENGTHS

(75) Inventors: Radhakrishna Valiveti, Union City, CA (US); Rajan Rao, Cupertino, CA (US); Robert G. Bryttegard, Huntington Beach, CA (US)

(73) Assignee: Infinera Corporation, Sunnyvale, CA (US)

( * ) Notice: Subject to any disclaimer, the term of this patent is extended or adjusted under 35 U.S.C. 154(b) by 194 days.

(21) Appl. No.: 13/336,305

(22) Filed: Dec. 23, 2011

(65) Prior Publication Data

US 2013/0108268 A1 May 2, 2013

Related U.S. Application Data

(60) Provisional application No. 61/553,004, filed on Oct. 28, 2011.

(51) Int. Cl.
*H04L 12/66* (2006.01)
(52) U.S. Cl.
USPC .......................................... 370/352; 398/45
(58) Field of Classification Search
CPC ..................................................... H04J 3/1652
See application file for complete search history.

(56) References Cited

U.S. PATENT DOCUMENTS

| | | | |
|---|---|---|---|
| 2004/0062277 A1* | 4/2004 | Flavin et al. | 370/474 |
| 2006/0104309 A1* | 5/2006 | Vissers et al. | 370/474 |
| 2007/0076769 A1* | 4/2007 | Zou | 370/539 |
| 2007/0189336 A1* | 8/2007 | Zou | 370/505 |
| 2008/0107418 A1* | 5/2008 | Zhang | 398/98 |
| 2008/0124079 A1* | 5/2008 | Zou | 398/58 |
| 2009/0074410 A1* | 3/2009 | Zou et al. | 398/52 |
| 2010/0098421 A1* | 4/2010 | Itou | 398/76 |
| 2010/0142947 A1* | 6/2010 | Shin et al. | 398/43 |
| 2010/0303464 A1* | 12/2010 | Dong et al. | 398/98 |
| 2011/0142438 A1* | 6/2011 | Youn et al. | 398/5 |
| 2011/0236031 A1* | 9/2011 | Itou | 398/141 |
| 2011/0286744 A1* | 11/2011 | Shin et al. | 398/45 |
| 2012/0002965 A1* | 1/2012 | Bellato et al. | 398/52 |
| 2012/0014270 A1* | 1/2012 | Honma et al. | 370/252 |
| 2012/0033969 A1* | 2/2012 | Sakauchi et al. | 398/48 |
| 2012/0045167 A1* | 2/2012 | Julien et al. | 385/14 |
| 2012/0057870 A1* | 3/2012 | Dong et al. | 398/52 |
| 2013/0004169 A1* | 1/2013 | Mohamad et al. | 398/45 |

* cited by examiner

*Primary Examiner* — Phirin Sam
(74) *Attorney, Agent, or Firm* — Harrity & Harrity LLP; David L. Soltz

(57) ABSTRACT

A node is configured to receive first optical channel data unit (ODU) signals; encapsulate one or more of the first ODU signals into a second ODU signal; encapsulate the second ODU signal into an optical channel transport unit (OTU) signal; and transmit the OTU signal on one or more optical channels.

18 Claims, 21 Drawing Sheets

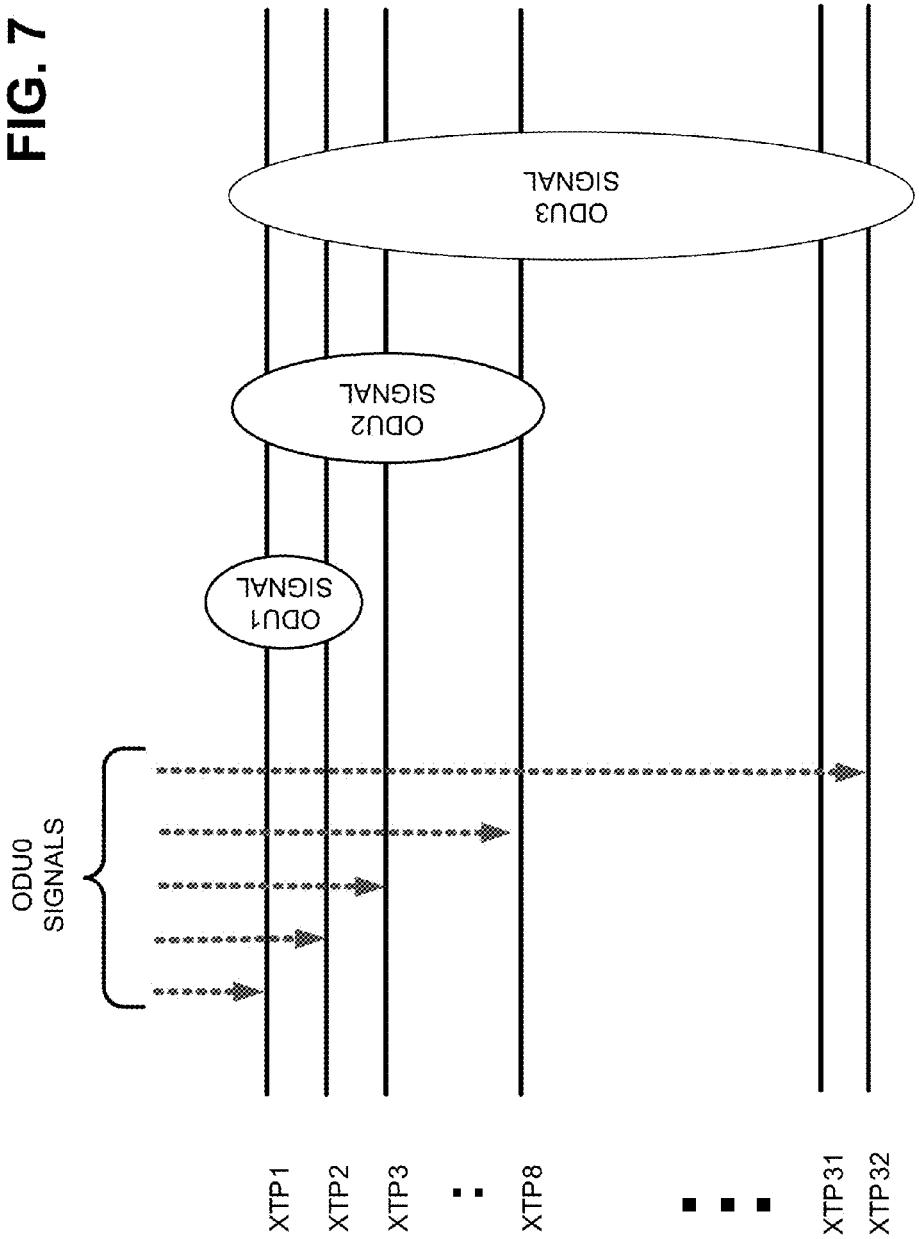

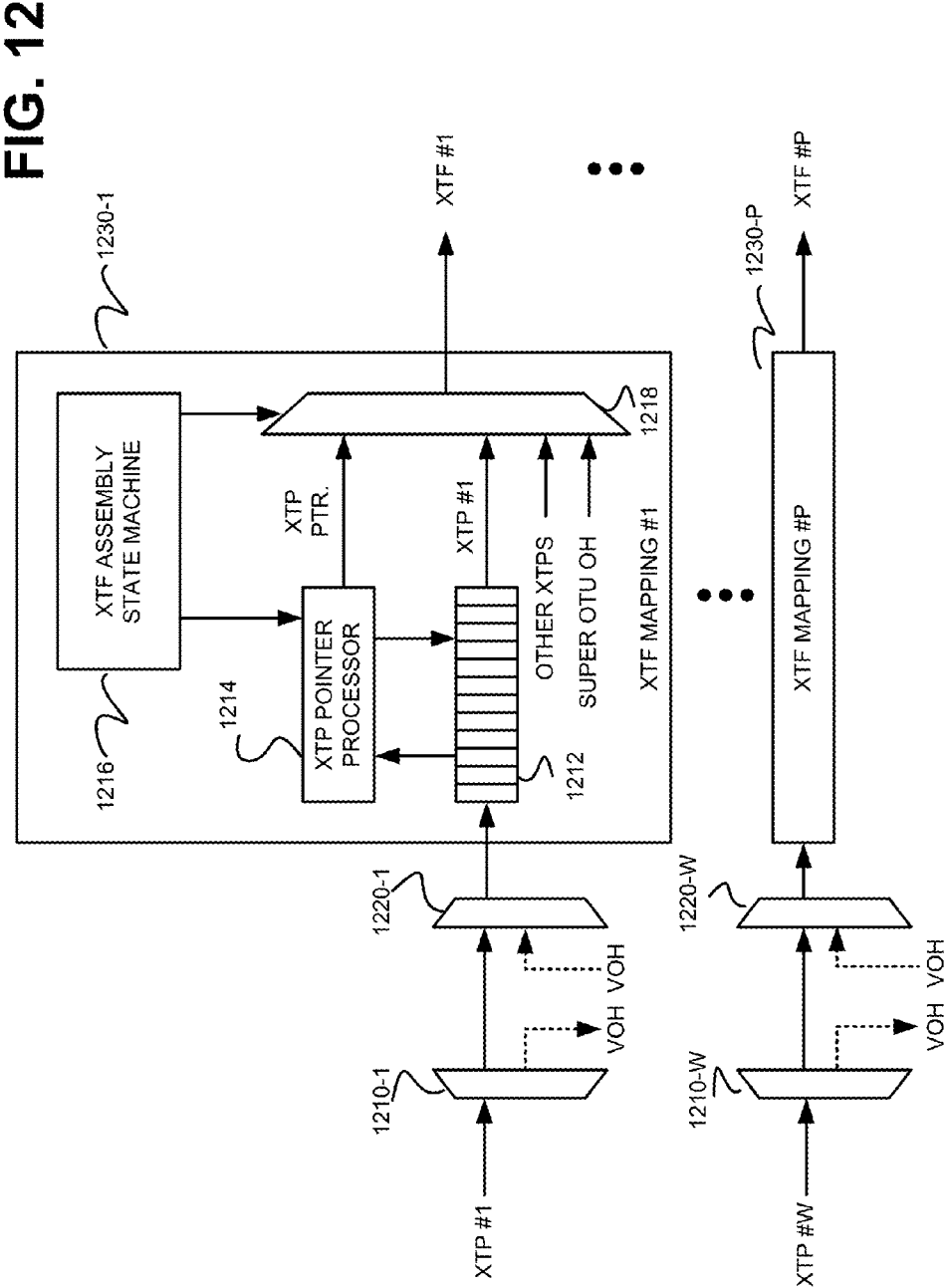

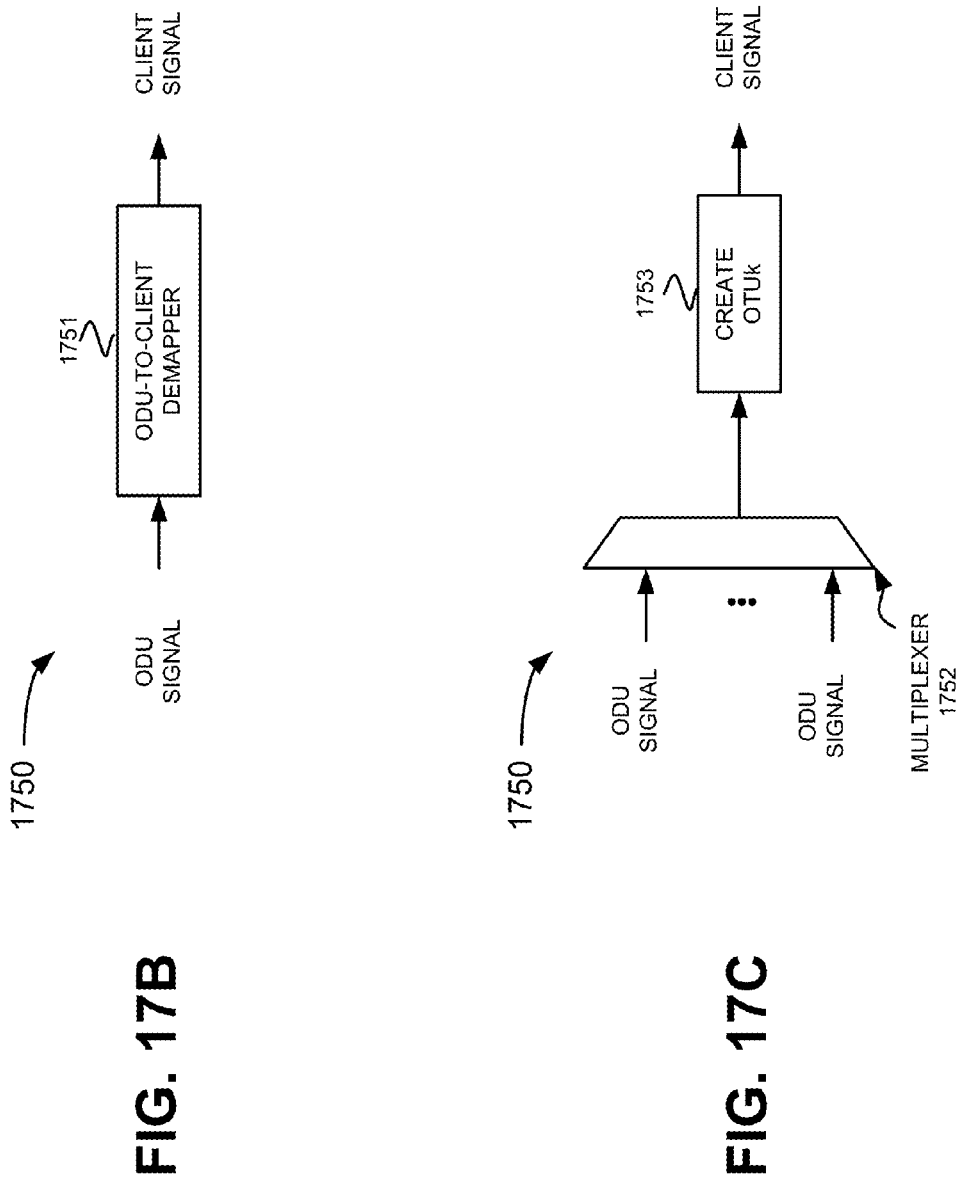

SUPER OPTICAL CHANNEL TRANSPORT UNIT SIGNAL SUPPORTED BY MULTIPLE WAVELENGTHS

RELATED APPLICATION

This application is a non-provisional application claiming priority to U.S. Provisional Application No. 61/553,004, filed Oct. 28, 2011, the disclosure of which is incorporated herein by reference.

BACKGROUND

An Optical Transport Network (OTN) is defined by ITU-T as a set of optical elements that are connected by optical links and that are capable of providing transporting, multiplexing, switching, management, and supervision functionality, and survivability of optical channels carrying client signals.

An OTN uses digital wrapper technology that provides a method for encapsulating data in an optical data unit. Generally, digital wrapping involves grouping a number of existing optical data units together into one entity that can be more efficiently managed with a small allocation of overhead and forward error correction (FEC) bytes. There are three levels of hierarchy for the encapsulation: the optical channel payload unit (OPUk) for encapsulation of client data; the optical channel data unit (ODUk) for encapsulating the OPUk data; and the optical channel transport unit (OTUk) for encapsulating the ODUk data.

From the perspective of a node in the optical network, the functions required to support the end-to-end transport of the client signals may include:

(1) Select an ODUk container that can transport the client signal.
(2) Determine if the network can support an end-to-end ODUk connection of the bit rate identified in step (1).
(3) If the network can support an end-to-end ODUk connection, the single ODU container occupies a single wavelength at every hop along the route from the source node to the destination node. Select and configure the correct ODU mappers/demappers at the ingress and egress nodes. The service setup has succeeded.
(4) If the network cannot support an end-to-end ODUk connection, the available network bandwidth is fragmented and the required bandwidth is not available within a single wavelength along every hop, but is distributed across multiple wavelengths. Determine if the network can route L independent ODUj connections end-to-end, where j<k, and L depends on the client signal rate, and the bit rate of the ODUj container. Find the largest j<k for which this step can succeed. If no combination of L ODUj containers can be found, the service setup fails.
(5) Instantiate a Virtual Concatenation Group (VCG) at the head and tail-end nodes, and configure the hardware appropriately, where the VCG members are ODU connections which are routed independently and, thus, encounter different latencies in their transit through the network. The service setup has succeeded.

The head-end node distributes the data from the client signal in a round-robin fashion among the VCG members. The ODU containers for all of the VCG members start out being frame (and frequency) aligned at the head-end node. The frames may arrive skewed at the receiver because of possible differing path latencies. The tail-end node performs a "deskew" operation to align the various VCG members, and then reconstructs the client signal by sequencing the data from the VCG members in a round-robin fashion.

The VCG approach creates operational difficulties for network operators. For example, network operators lose the 1:1 correspondence between a service and the ODU instance that is transporting the tributary signal supplied by the customer edge device. In the VCG scenario, some services are supported by multiple ODU server layers. Also, the VCG approach may create a need to monitor multiple ODU connections for each service. This would mean monitoring each of the ODU connections to gather alarms and performance information. Further, the head-end node may need to support the independent restoration/reroute of each of these ODU connections (upon the detection of a failure). The protection/restoration of the individual VCG members needs to be coordinated to ensure that the end-to-end skew between the VCG members is within the range that the tail-end can handle. Moreover, even when a service was initially setup via mapping to a single ODU container, the restoration that occurs following a network resource failure (e.g. link/node) may make use of a VCG containing multiple lower bit rate ODU containers. More specifically, each service could be set up with or without the use of VCG. This aspect makes it difficult for the network operators to troubleshoot and fix network issues that occur.

SUMMARY

According to one possible implementation, a network may include a group of nodes. One of the nodes may be configured to receive first optical channel data unit (ODU) signals; encapsulate one or more of the first ODU signals into a second ODU signal; encapsulate the second ODU signal into an optical channel transport unit (OTU) signal; and transmit the OTU signal on a group of optical channels. Each optical channel, in the group of optical channels, may have a corresponding wavelength. Each optical channel, in the group of optical channels, may have a corresponding bit rate. A bit rate of the OTU signal may be based on a sum of the bit rates of the group of optical channels. A bit rate of the second ODU signal may be proportional to the bit rate of the OTU signal.

According to another possible implementation, a node, of a group of nodes in an optical network, may include at least one module to receive a group of first ODU signals; multiplex the first ODU signals into a second ODU signal; encapsulate the second ODU signal into an OTU signal; and transmit the OTU signal on an optical channel. The optical channel may support multiple wavelengths. Each of the wavelengths may have a corresponding a bit rate. A bit rate of the OTU signal may be related to the bit rates corresponding to the wavelengths. A bit rate of the second ODU signal may be related to the bit rate of the OTU signal.

According to a further possible implementation, a method, performed in a network that includes a group of nodes, may include receiving first ODU signals; multiplexing the first ODU signals into a second ODU signal, where a bit rate of the second ODU signal may be greater than a bit rate of one or more of the first ODU signals; encapsulating the second ODU signal into an OTU signal; and transmitting the OTU signal on a group of optical channels. Each of the optical channels may correspond to a respective one of a group of wavelengths. Each of the optical channels may have a corresponding bit rate. A bit rate of the OTU signal may be related to a sum of the bit rates of the optical channels.

According to another possible implementation, a method, performed in a network that includes a group of nodes, may include receiving first ODU signals; multiplexing the first ODU signals into a second ODU signal; encapsulating the second ODU signal into an OTU signal; and transmitting the OTU signal on an optical channel. The optical channel may support multiple wavelengths. Each of the wavelengths may have a corresponding bit rate. A bit rate of the OTU signal may be related to a sum of the bit rates corresponding to the wavelengths.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 7 is a diagram illustrating an example of mapping ODU signals to XTP frames according to one implementation;

FIG. 12 is a diagram of example functional components for asynchronously mapping an XTP frame into an XTF frame;

FIG. 17B is a diagram of an example functional component for obtaining a client signal according to one example implementation;

FIG. 17C is a diagram of example functional components for obtaining a client signal according to another example implementation;

DETAILED DESCRIPTION

The following detailed description refers to the accompanying drawings. The same reference numbers in different drawings may identify the same or similar elements.

A system or method, described herein, may address the operational difficulties encountered by supporting services over a VCG composed of multiple ODU connections. The system or method may involve creating a super-rate OTU signal (hereinafter referred to as a "super OTU signal") that is supported by multiple wavelengths. In one implementation, the system or method may also include the automatic creation of a corresponding super-rate ODU signal (hereinafter referred to as a "super ODU signal") that is supported by the super OTU signal. The super ODU signal may have a bit rate (or bandwidth) proportional to the bit rate (or bandwidth) of the super OTU signal.

The super OTU signal may be applicable to an arbitrary number of wavelengths with arbitrary digital capacity. Also, or alternatively, the super OTU signal may support arbitrary (and vendor proprietary) bit rates. Also, or alternatively, the super OTU signal may support large enough DWDM-side (or "line-side") ODU containers to avoid (or significantly reduce the likelihood of requiring) concatenated ODU connections. The super OTU signal can support the realization of OTUkV signals with bit rates which are integral multiples of the digital capacity of the wavelengths utilized on the DWDM side, and can support vendor-specific FEC information. An OTUkV signal may refer to a vendor-specific OTUk signal, which may vary from the OTUk signal defined by ITU.

Figure 1A:
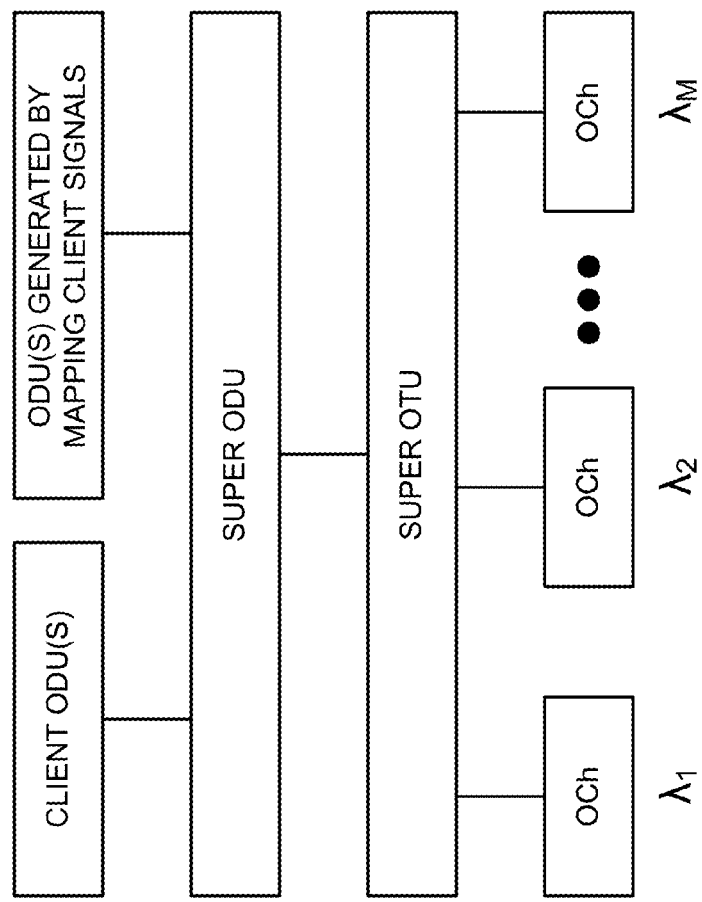
FIG. 1A is a diagram of an overview of an example implementation described herein.

FIG. 1A is a diagram of an overview of an example implementation described herein. As shown generally in FIG. 1A, one or more client ODU signals (e.g., one or more client ODU signals received from one or more clients and encapsulated in one or more OTU signals) and/or one or more ODU signals generated by mapping received client signals into the one or more ODU signals may be used to form a super ODU signal. The term ODU signal will be used, herein, to refer generally to a client ODU signal or an ODU signal generated by mapping a client signal, and may include other forms of ODU signals, such as ODUflex signals. In one implementation, the super ODU signal may take the form of an ODUkV signal. An ODUkV signal may refer to a vendor-specific ODUk signal, which may vary from the ODUk signal defined by ITU. The super ODU signal may be encapsulated within a super OTU signal.

As shown in FIG. 1A, the super OTU signal may be supported by multiple optical channels (OCh) of wavelengths $\lambda_1$, $\lambda_2, \ldots, \lambda_M$, where $M \geq 1$. The super OTU signal may have a bandwidth (or bit rate) of approximately M times the (digital) bandwidth (or bit rate) of each optical channel. For example, assume that M=5 and each of the optical channels has a bit rate of 100 Gbps. In this situation, the super OTU signal may have a bit rate of approximately 500 Gbps (i.e., the combined effective bit rate of the M optical channels).

Figure 1B:
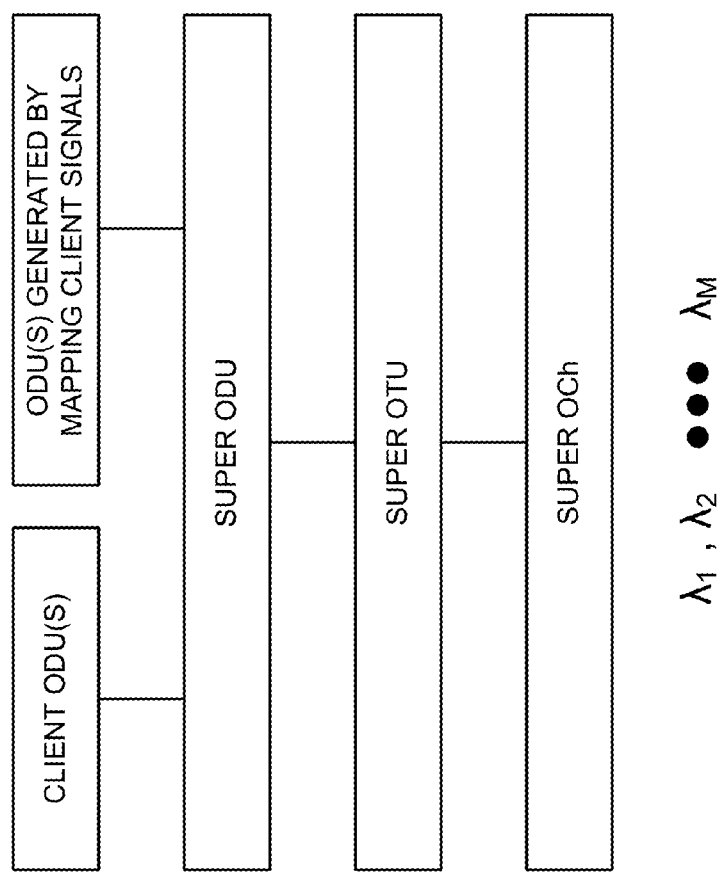
FIG. 1B is a diagram of an overview of another example implementation described herein.

FIG. 1B is a diagram of an overview of another example implementation described herein. As shown generally in FIG. 1B and similar to FIG. 1A, one or more client ODU signals (e.g., one or more client ODU signals received from one or more clients and encapsulated in one or more OTU signals) and/or one or more ODU signals generated by mapping received client signals into the one or more ODU signals may be used to form a super ODU signal, which may be encapsulated in a super OTU signal. In contrast to FIG. 1A, however, and as shown in FIG. 1B, the super OTU signal may be supported by a super optical channel (OCh) of wavelengths $\lambda_1, \lambda_2, \ldots, \lambda_M$, where $M \geq 1$. The super OTU signal may have a bandwidth (or bit rate) of approximately M times the (digital) bandwidth (or bit rate) associated with the wavelengths. For example, assume that M=5 and each of the wavelengths has a bit rate of 100 Gbps. In this situation, the super OTU signal may have a bit rate of approximately 500 Gbps (i.e., the combined effective bit rate of the M wavelengths).

In either of the implementations of FIG. 1A or FIG. 1B, the bit rate of the super ODU signal may be related to the bit rate of the super OTU signal. For example, in one implementation, the bit rate of the super ODU signal may be related to the ratio of the non-FEC information bytes to the total OTU signal frame size.

In one example implementation, the super ODU signal and the super OTU signal may be terminated within a single line module (or field replaceable unit "FRU") within a node, such as a DWDM device. One reason for this may be to permit access to all of the overhead information in a component (e.g., a field programmable gate array ("FPGA")) located on a line module. Assume that an advanced OTN line module ("AOLM") can support, for example, 5 optical channels each with a capacity of 100 Gbps or a super optical channel with a capacity of 500 Gbps. This configuration may support the realization of approximately a 500 Gbps super ODU or OTU signal. As line module technology evolves and the node is able to provide even more bandwidth on the line-side, the line module may scale to support higher bit rate OTU signals and ODU signals.

The implementations, described herein, refer to certain types of frames, including switching transport path (XTP) frames and switching transport format (XTF) frames. The XTP frame may refer to a structure of a particular, constant length, and a fixed bit rate, which is independent of the bit rate of an ODU signal that the XTP frame carries. The XTP frame may be optimized to carry one or more ODU signals. The data of a super ODU may be transported in one or more XTP frames.

The XTF frame may refer to a structure of a particular, constant length, and a fixed nominal bit rate, which is independent of the bit rate of an ODU signal and the bit rate of an XTP that the XTF carries. The XTF frame may be optimized to carry one XTP frame or a group of XTP frames over multiple optical channels of different wavelengths. The data of a super OTU may be transported in one or more XTF frames. The XTF frame may include error correction coding and/or other overhead that enables management, fault detection, and performance monitoring for an optical link.

While the description to follow will describe a technique for mapping ODU overhead data into the overhead section of a frame so that the ODU overhead data is available for processing by nodes of the network, there may be other reasons and/or other techniques for making the ODU overhead data available to nodes in the network. For example, rather than performing a dual mapping (e.g., mapping the ODU data into an XTP frame and mapping the XTP frame into an XTF frame), another form of mapping may be used. Also, rather than mapping the ODU overhead data into the overhead section of a frame, the ODU overhead data may be mapped elsewhere while still making that ODU overhead data available to nodes in the network.

Example Network

Figure 2:
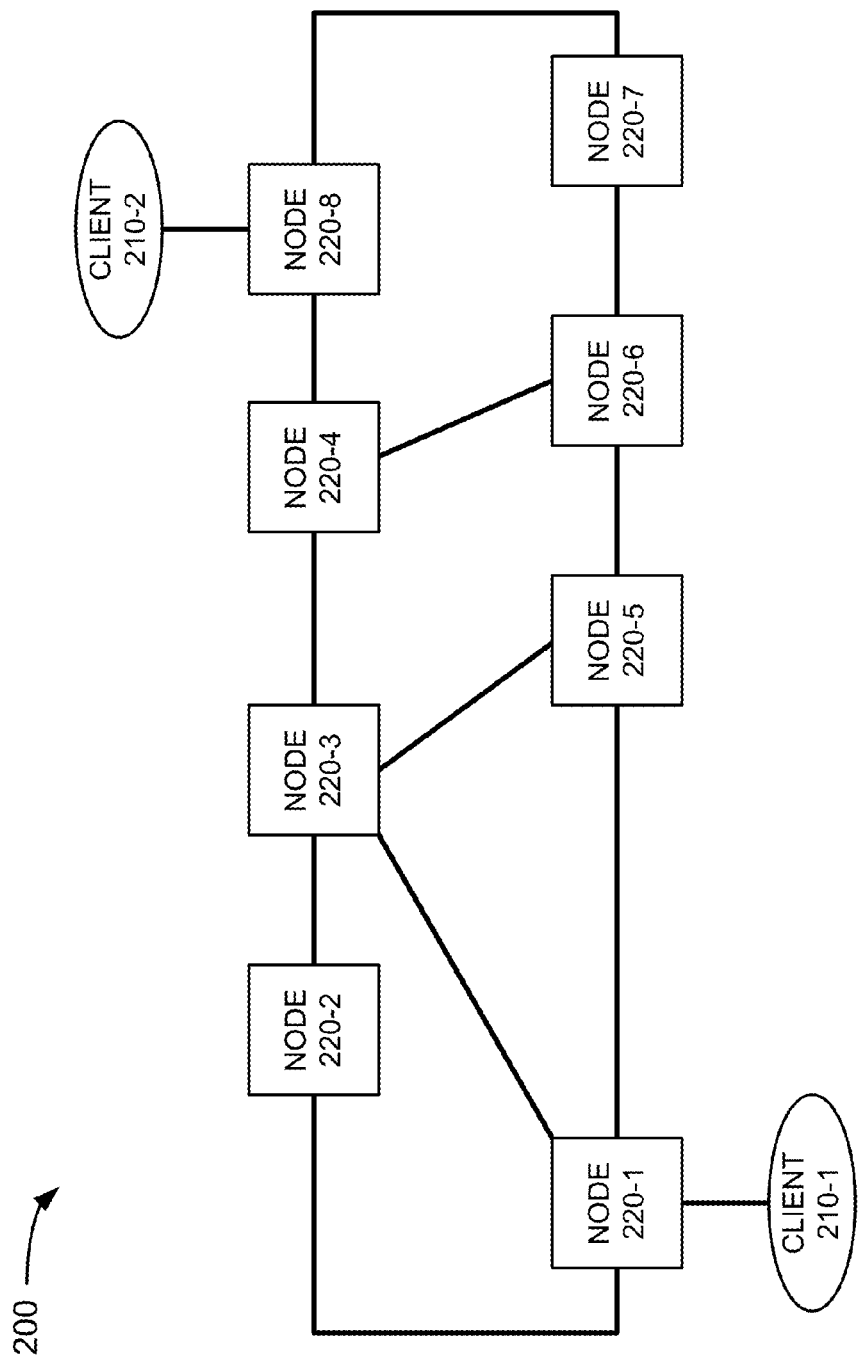
FIG. 2 is a diagram of an example network in which systems and/or methods described herein may be implemented.

FIG. 2 is a diagram of an example network 200 in which systems and/or methods described herein may be implemented. For example, network 200 may include clients 210-1 and 210-2 (referred to collectively as "clients 210," and generally as "client 210") and nodes 220-1, ..., 220-8 (referred to collectively as "nodes 220," and generally as "node 220"). While FIG. 2 shows a particular quantity and arrangement of devices, network 200 may include additional devices, fewer devices, different devices, or differently arranged devices than those illustrated in FIG. 2. Also, the connections between devices may include direct or indirect connections.

Client 210 may include any type of network device, such as a router, a switch, or a central office, that may transmit data traffic. In one implementation, client 210 may transmit a client signal (e.g., a client ODU signal, a synchronous optical network (SONET) signal, a synchronous digital hierarchy (SDH) signal, an Ethernet signal, or another type of signal) to node 220. The client signal may conform to any payload type, such as Gigabit Ethernet (GbE), 2xGbE, Fibre Channel (FC), 1GFC, 10 GbE local area network (LAN) physical layer (Phy), 10 GbE wide area network (WAN) Phy, Synchronous Transport Mode 16 (STM-16), STM-64, Optical Carrier level 48 (OC-48), or OC-192.

Node 220 may include a DWDM device or another type of network device. Node 220 may perform optical multiplexing operations (e.g., receive individual client signals on individual optical links and generate a multi-wavelength signal that may be transmitted on a single optical link), optical amplification operations (e.g., amplify the multi-wavelength signal), optical add-drop multiplexing operations (e.g., remove one or more client signals from the multi-signal and separate the multi-wavelength signal back into individual client signals that may be transmitted on individual optical links). To perform these operations, node 220 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM) to perform the optical add-drop multiplexing operations), and/or an optical demultiplexer (to perform the optical demultiplexing operations).

Nodes 220 may be connected via optical links. Data traffic may flow from node-to-node over a series of channels/sub-channels forming a path. Any two nodes 220 may connect via multiple optical links. For bidirectional communication, for example, a first optical link may be used for data traffic transmitted in one direction, a second optical link may be used for data traffic transmitted in the opposite direction, and a third optical link may be used in case of a failure on the first link or the second link. A "working path" may refer to a set of channels/sub-channels associated with one or more first optical links (or second optical links) between two nodes 220. A "protection path" may refer to a set of channels/sub-channels associated with one or more third optical links between two nodes 220. In practice, there may be R working paths and S protection paths between two nodes 220, where $S \leq R$.

A node 220 that receives a client signal from a client 210 will be referred to as an "ingress node." A node 220 that transmits a client signal to a client 210 will be referred to as an "egress node." Nodes 220 on the path between the ingress node and the egress node will be referred to as "intermediate nodes." Thus, if client 210-1 transmits a client signal to client 210-2 on a path that includes nodes 220-1, 220-3, 220-4, and 220-8, node 220-1 is the ingress node, node 220-8 is the egress node, and nodes 220-3 and 120-4 are the intermediate nodes. A node 220 may act as an ingress node with regard to one client signal and an intermediate or egress node with regard to another client signal. Thus, nodes 220 may form an arbitrary mesh network.

Example Node Components

Figure 3:
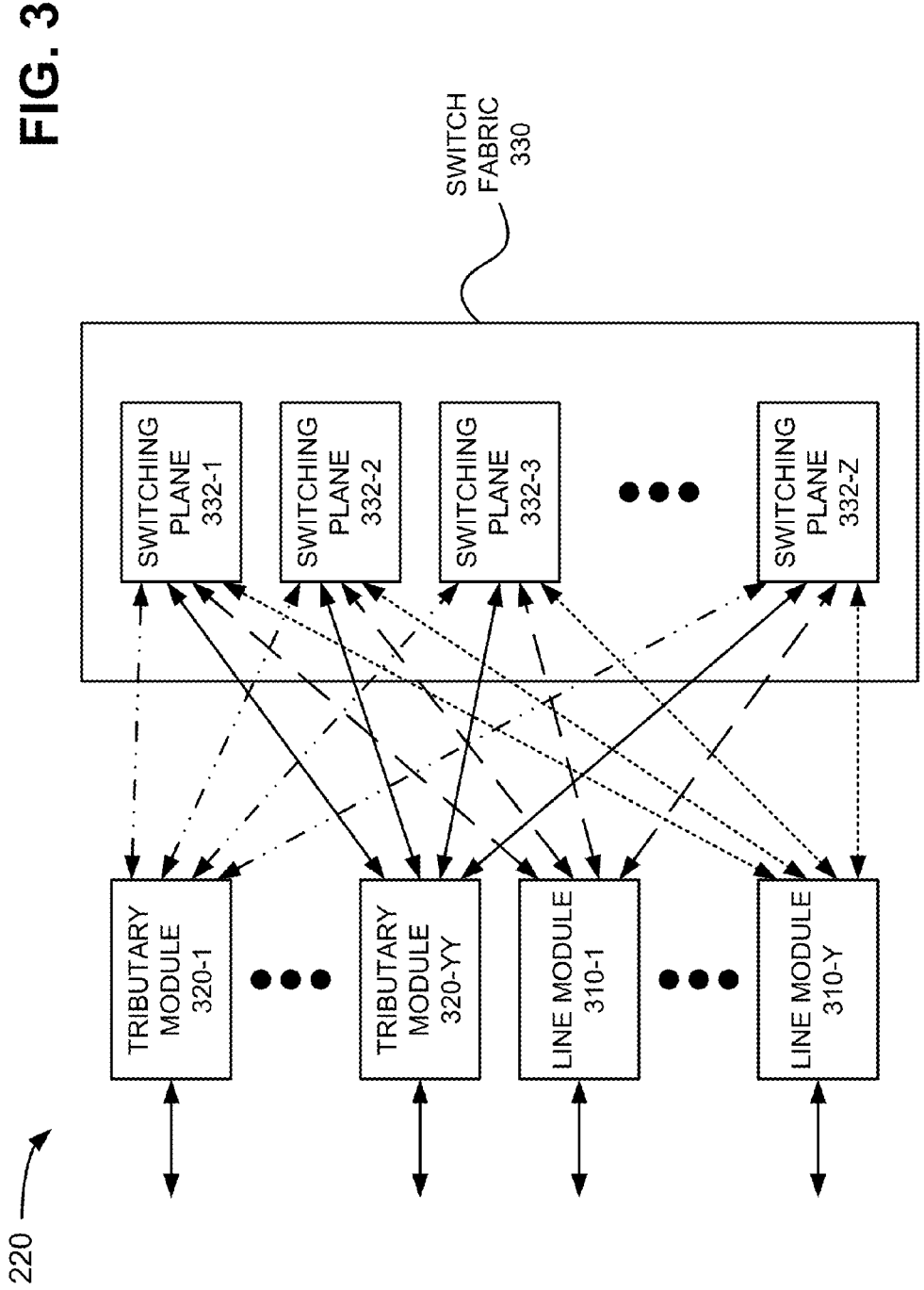
FIG. 3 is a diagram of example components of a node of FIG. 2.

FIG. 3 is a diagram of example components of node 220. As shown in FIG. 3, node 220 may include line modules 310-1, . . . , 310-Y (referred to collectively as "line modules 310," and generally as "line module 310") (where Y≥1) and tributary modules 320-1, . . . , 320-YY (referred to collectively as "tributary modules 320," and generally as "tributary module 320") (where YY≥1) connected to a switch fabric 330. As shown in FIG. 3, switch fabric 330 may include switching planes 332-1, 332-2, . . . 332-Z (referred to collectively as "switching planes 332," and generally as "switching plane 332") (where Z≥1). While FIG. 3 shows a particular quantity and arrangement of components, node 220 may include additional components, fewer components, different components, or differently arranged components than those illustrated in FIG. 3. Also, it may be possible for one of the components of node 220 to perform a function that is described as being performed by another one of the components.

Line module 310 may include hardware components, or a combination of hardware and software components, that may provide network interface operations. Line module 310 may receive a multi-wavelength optical signal and/or transmit a multi-wavelength optical signal. A multi-wavelength optical signal may include a number of optical signals of different optical wavelengths. In one implementation, line module 310 may perform retiming, reshaping, regeneration, time division multiplexing, and/or recoding services for each optical wavelength. Line module 310, associated with an ingress node, may also multiplex ODU signals into a super ODU signal, and asynchronously map the data of the super ODU signal into one or more XTP frames.

Tributary module 320 may include hardware components, or a combination of hardware and software components, that may support flexible adding-dropping of multiple services, such as SONET/SDH services, GbE services, optical transport network (OTN) services, and FC services. Tributary module 320 may perform functions, such as client data encapsulation and decapsulation. In one implementation, tributary module 320, associated with an ingress node, may receive a stream of data that includes one or more ODU signals encapsulated in one or more OTU signals. In another implementation, tributary module 320, associated with an ingress node, may receive a stream of data that includes one or more client (non-OTN) signals and map the client signals into one or more ODU signals. A tributary module 320, associated with an egress node, may receive an XTP frame (or a collection of XTP frames) and recover the ODU signals from the XTP frame (or collection of XTP frames).

Switch fabric 330 may include hardware components, or a combination of hardware and software components, that may provide switching functions to transfer data between line modules 310 and/or tributary modules 320. In one implementation, switch fabric 330 may provide fully non-blocking transfer of data. Switch fabric 330 may be configured to switch with the granularity of a single XTP frame. Each switching plane 332 may be programmed to transfer data from a particular input to a particular output.

As shown in FIG. 3, each of line modules 310 and tributary modules 320 may connect to each of switching planes 332. The connections between line modules 310/tributary modules 320 and switching planes 332 may be bidirectional. While a single connection is shown between a particular line module 310/tributary module 320 and a particular switching plane 332, the connection may include a pair of unidirectional connections (i.e., one in each direction). A connection from a line module 310/tributary module 320 to a switching plane 332 will be referred to herein as an "ingress switch link," and a connection from a switching plane 332 to a line module 310/tributary module 320 will be referred to as an "egress switch link."

Figure 4:
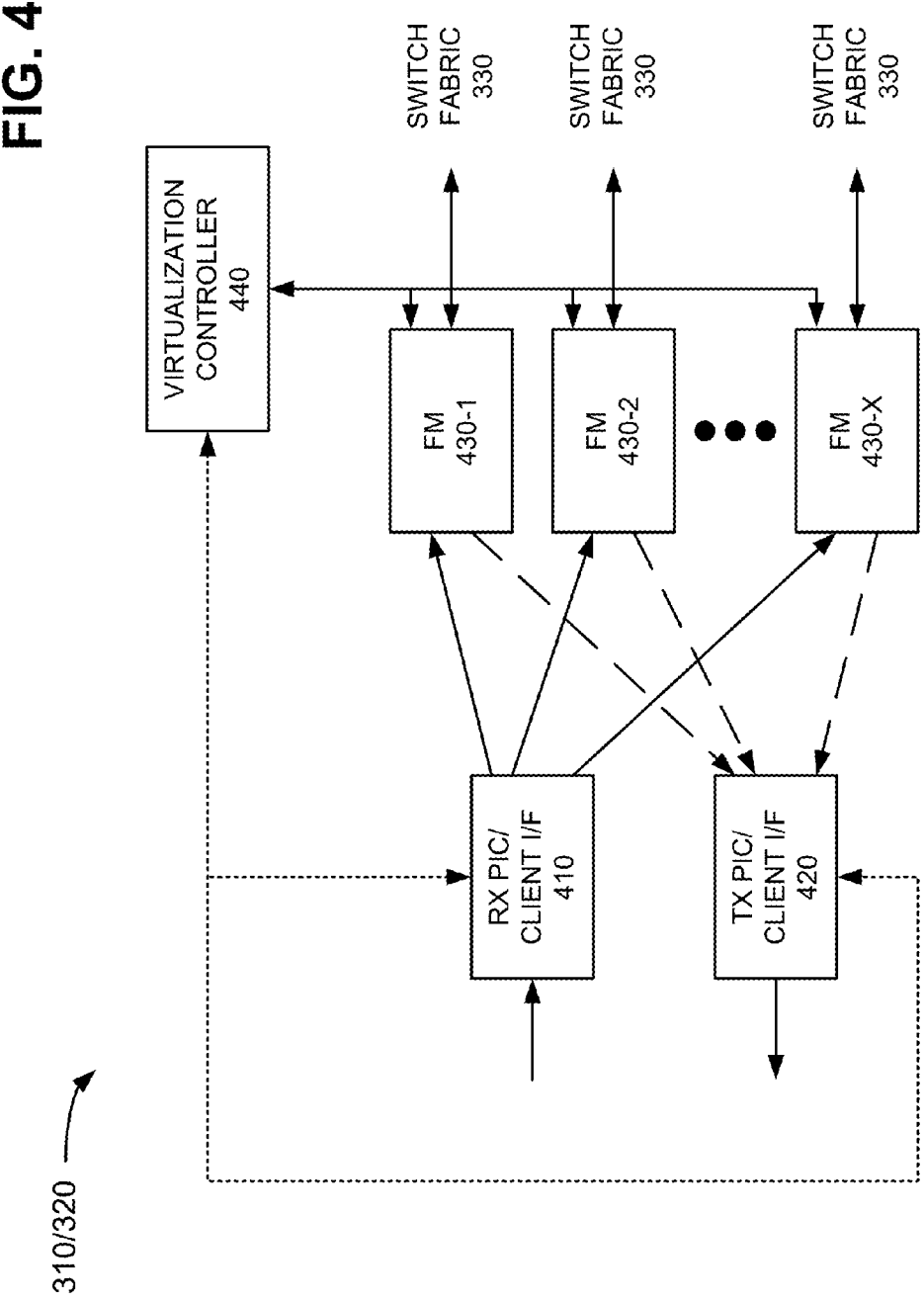
FIG. 4 is a diagram of example components of a line module of FIG. 3.

FIG. 4 is a diagram of example components of a line module 310 or a tributary module 320. As shown in FIG. 4, line module 310/tributary module 320 may include a receiver (RX) photonic integrated circuit (PIC) or client interface (I/F) 410, a transmitter (TX) PIC or client I/F 420, fabric managers (FMs) 430-1, 430-2, . . . , 430-X (referred to collectively as "FMs 430," and generally as "FM 430") (where X≥1), and a virtualization controller 440. While FIG. 4 shows a particular quantity and arrangement of components, line module 310/tributary module 320 may include additional components, fewer components, different components, or differently arranged components than those illustrated in FIG. 4. Also, it may be possible for one of the components of line module 310/tributary module 320 to perform a function that is described as being performed by another one of the components.

A line module 310 may include a receiver PIC 410 and a transmitter PIC 420. A tributary module 320, on the other hand, may include a client I/F 410 and a client I/F 420. Receiver PIC 410 may include hardware, or a combination of hardware and software, that may receive a multi-wavelength optical signal, separate the multi-wavelength signal into signals of individual wavelengths, and convert the signals to digital form. In one implementation, receiver PIC 410 may include components, such as a photodetector, a demultiplexer, and/or an optical-to-electrical converter. Transmitter PIC 420 may include hardware, or a combination of hardware and software, that may convert signals from digital form, combine the signals of the individual wavelengths into a multi-wavelength signal, and transmit the multi-wavelength signal. In one implementation, transmitter PIC 420 may include components, such as an electrical-to-optical converter, a multiplexer, and/or a laser.

Client I/F 410 may include hardware, or a combination of hardware and software, that may receive an optical signal, possibly in the form of a client signal, from a client 210. In one implementation, client I/F 410 may include components, such as a photodetector, a demultiplexer, and/or an optical-to-electrical converter. Client I/F 420 may include hardware, or a combination of hardware and software, that may transmit an optical signal, possibly in the form of a client signal, to a client 210. In one implementation, client I/F 420 may include components, such as an electrical-to-optical converter, a multiplexer, and/or a laser.

As shown in FIG. 4, receiver PIC or client I/F 410 and transmitter PIC or client I/F 420 may connect to each of FMs 430 and/or virtualization controller 440. Receiver PIC or client I/F 410 may transfer data to FMs 430. Transmitter PIC or client I/F 420 may receive data from FMs 430.

FM 430 may include hardware, or a combination of hardware and software, that may process digital signals for transmission to switching plane 332 or transmitter PIC or client I/F 420. In one implementation, FM 430, associated with an ingress node, may receive a stream of data associated with one or more client ODU signals, and/or may receive a stream of data associated with one or more client (non-OTN) signals and map the one or more client signals to one or more ODU signals. FM 430, associated with the ingress node, may multiplex the ODU signals into a super ODU signal, encapsulate data of the super ODU signal in one or more XTP frames, and transmit the one or more XTP frames to one or more switching planes 332. FM 430 may asynchronously map the XTP frame into another frame that is used to transmit the XTP frame through switch fabric 220 and recover the XTP frame from this other frame when received from switch fabric 220. FM 430 may also asynchronously map an XTP frame into an XTF frame for transmission, on an optical link, to another node, and recover an XTP frame from an XTF frame received, on an optical link, from another node.

FM 430 may divide a stream of data (representing an XTP frame) into chunks of continuous bytes, called "timeslots," associated with particular channels (e.g., a channel may refer to a communication between a particular source and a particular destination). In one implementation, each timeslot may include the same quantity of bytes (e.g., each timeslot may be of equal bandwidth). In another implementation, each timeslot may not include the same quantity of bytes (e.g., at least one timeslot may be of a different bandwidth). The stream of data received by FM 430 may, in one implementation, already be segmented into timeslots. In this situation, when dividing the stream of data into timeslots, FM 430 may identify the timeslots based on, for example, identifiers in the stream or the temporal position, of the data, within the stream.

FM 430 may divide the data in each timeslot into a number of equal-bandwidth blocks of data. In one implementation, the quantity of blocks may equal the quantity of switches available in switching planes 332. Assume, for example, that there are 16 switches available in switching planes 332. In this case, FM 430 may divide the data in a timeslot into 16 equal blocks. FM 430 may send each of the blocks to a different one of the switches. In one implementation, FM 430 may sequentially send each of the blocks in a round robin fashion. In another implementation, FM 430 may send out each of the blocks in another systematic fashion.

Virtualization controller 440 may include hardware, or a combination of hardware and software, that may operate upon the overhead data of one or more ODU signals to generate ODU overhead data. For example, FM 430, of the ingress node, may extract overhead data from a group of ODU signals, such as an array of overhead data from multiple ODU layers (one of which may correspond to the client ODU layer), and send the ODU overhead data to virtualization controller 440. Virtualization controller 440, of the ingress node, may receive the ODU overhead data from FM 430 and create virtual overhead (VOH) data. Virtualization controller 440, of the ingress node, may compress the ODU overhead data in order to reduce the level of transmission bandwidth needed to carry the ODU overhead data, and in order to minimize cost, the amount of circuitry required, and power dissipation. Additionally, or alternatively, virtualization controller 440 may stack overhead data associated with the multiple ODU layers. Virtualization controller 440, of the ingress node, may send the VOH data to FM 430 for inclusion in one or more XTP frames. FM 430, of the ingress node, may receive the VOH data from virtualization controller 440 and provide the VOH data as overhead data in one or more XTP frames.

FM 430, of an intermediate node, may extract the VOH data from one or more XTP frames and send the VOH data to virtualization controller 440. Virtualization controller 440, of the intermediate node, may receive the VOH data from FM 430 and manipulate the VOH data. In one implementation, virtualization controller 440, of the intermediate node, may process the VOH data, such as performing OTN services (e.g., monitoring all or part of the path used to transport the ODU data, generating or modifying overhead (e.g., VOH) data, etc.). Virtualization controller 440, of the intermediate node, may send the VOH data to FM 430 for inclusion in one or more XTP frames. FM 430, of the intermediate node, may receive VOH data from virtualization controller 440 and provide the VOH data as overhead data in one or more XTP frames. In an alternative implementation, virtualization controller 440 may generate VOH data for inclusion in one or more XTP frames, rather than receiving and processing VOH data from FM 430.

FM 430, of an egress node, may extract the VOH data from one or more XTP frames and send the VOH data to virtualization controller 440. Virtualization controller 440, of the egress node, may receive the VOH data from FM 430 and recover the ODU overhead data. In one implementation, virtualization controller 440, of the egress node, may decompress the VOH data to recover the ODU overhead data. Virtualization controller 440, of the egress node, may send the recovered ODU overhead data to FM 430 for inclusion in the overhead section of the ODU signal. FM 430, of the egress node, may receive ODU overhead data from virtualization controller 440 and, in one implementation, may replace the original ODU overhead data of the ODU signal with the ODU overhead data from virtualization controller 440.

Figure 5:
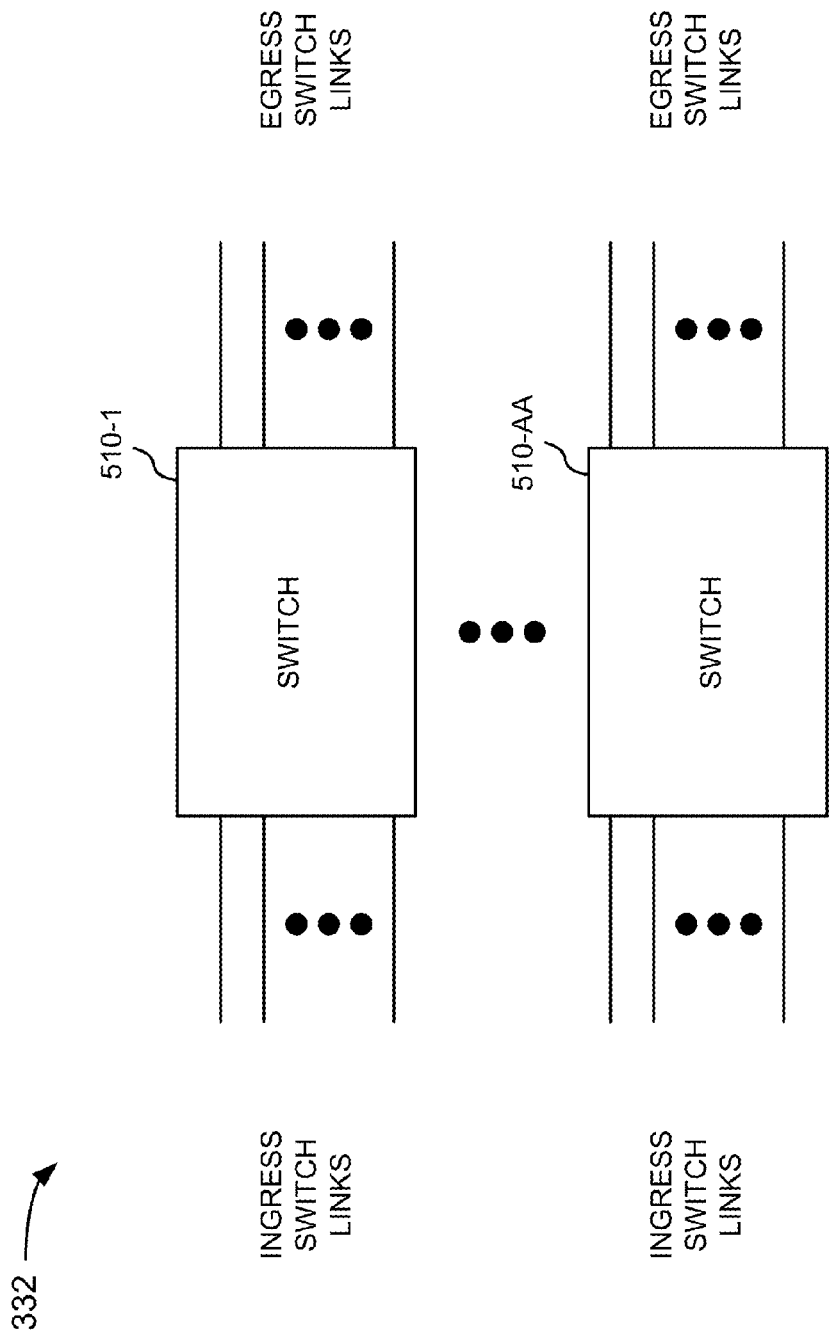
FIG. 5 is a diagram of example components of a switch plane of the switch fabric of FIG. 3.

FIG. 5 is a diagram of example components of a switching plane 332. As shown in FIG. 5, switching plane 332 may include switches 510-1, . . . , 510-AA (referred to collectively as "switches 510," and generally as "switch 510") (where AA≥1). While FIG. 5 shows a particular quantity and arrangement of components, switching plane 332 may include additional components, fewer components, different components, or differently arranged components than those illustrated in FIG. 5. Also, it may be possible for one of the components of switching plane 332 to perform a function that is described as being performed by another one of the components.

Switch 510 may include hardware, or a combination of hardware and software, that may transfer a block of data received in a timeslot on an ingress switch link to a timeslot on an egress switch link, where the timeslot on the ingress switch link may differ from the timeslot on the egress switch link. Switch 510 may include a set of ingress switch links via which data is received, and a set of egress switch links via which data is transmitted. Each ingress switch link and egress switch link may connect to a particular FM 430. Switch 510 may be programmed with mapping information that instructs switch 510 on which egress switch link and in what timeslot to send a block of data received within a particular timeslot on a particular ingress switch link.

XTP and XTF Frame Formats

Figure 6:
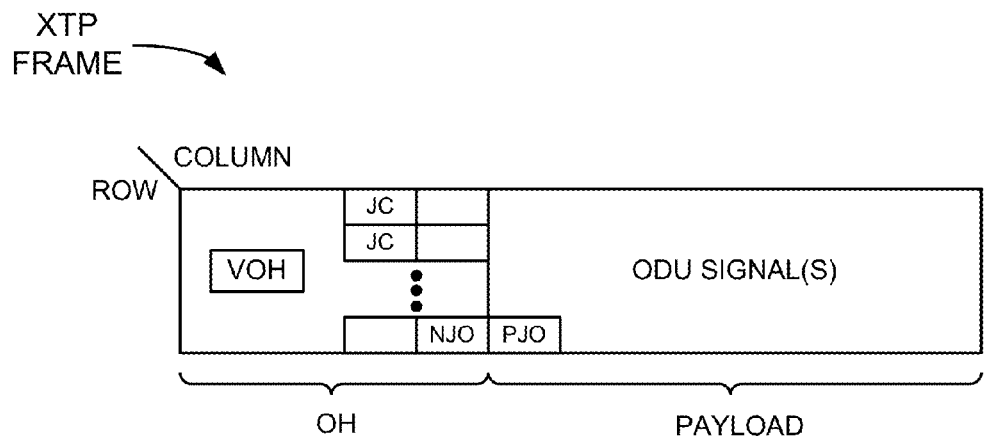
FIG. 6 is a diagram of example data of a switching transport path (XTP) frame.

FIG. 6 is a diagram of example data of an XTP frame. As shown in FIG. 6, an XTP frame may include an overhead (OH) section and a payload section. In another implementation, the XTP frame may include additional or different sections than those shown in FIG. 6. For example, the XTP frame may include an error correction section, such as a FEC section, that may store data to aid in detecting and correcting errors.

The data of the XTP frame may be arranged as bytes of data in a number of rows and columns. When the XTP frame is transmitted, the data bytes in the first row may be transmitted, followed by the data bytes in the second row, and so forth. Thus, transmission of the XTP frame may include the transmission of overhead data followed by payload data (from the first row), the transmission of overhead data followed by payload data (from the second row), etc.

The overhead section may include data that aids in creation, transmission, performance management, fault management, and/or recovery of data of the XTP frame. In one implementation, the overhead section may include data similar to the data described in ITU-T Recommendation G.709. The payload section may include data from one or more ODU signals.

As shown in FIG. 6, the overhead section may include VOH data. As explained above, VOH data may correspond to ODU overhead data from one or more ODU signals. As described elsewhere, the ODU overhead data may be copied from the ODU signal(s), processed, and provided as VOH data in the overhead section of the XTP frame. The VOH data may be provided at a particular location within the overhead section of the XTP frame to facilitate the identification of the VOH data within the XTP frame.

The XTP frame may use a combination of fixed and variable stuff locations to adapt the ODU signal rate to the payload section of the XTP frame at a fixed bit rate, where the fixed bit rate of the XTP frame is independent of the bit rate of the ODU signal. In one implementation, the bit rate of the XTP frame is approximately 1.3324 Gbps. In another implementation, the bit rate of the XTP frame may be less than or greater than 1.3324 Gbps.

The XTP frame may use a combination of justification control (JC) data and a negative justification opportunity (NJO) in the overhead section, and fixed and variable stuff areas in the payload section of the XTP frame to compensate for the bit rate of the ODU signal. Fixed stuff locations are locations (that may be distributed throughout the payload) that do not carry any data in the payload section. The fixed stuff locations may vary for different ODU signal rates. The variable stuff location may refer to a location (shown as a positive justification opportunity (PJO) in FIG. 6) in the payload section that may or may not carry data in the XTP frame. A decision may be made, once per XTP frame, whether to include data in the variable stuff location or to "stuff" the variable stuff location (i.e., include null data).

FIG. 7 is a diagram illustrating an example of mapping ODU signals to XTP frames according to one implementation. The mappings, shown in FIG. 7, are intended to be examples of ODU mappings that can occur. In other implementations, an ODU signal may be mapped to a greater quantity of XTP frames or a smaller quantity of XTP frames than are shown in FIG. 7.

As shown in FIG. 7, an ODU0 signal may map to a single XTP frame. In other words, the payload of a single XTP frame may be sufficient to carry the data of a single ODU0 signal. Additionally, or alternatively, an ODU1 signal may map to 2 XTP frames. In other words, the payloads of 2 XTP frames may be sufficient to carry the data of a single ODU1 signal. Additionally, or alternatively, an ODU2 signal may map to 8 XTP frames. In other words, the payloads of 8 XTP frames may be sufficient to carry the data of a single ODU2 signal. Additionally, or alternatively, an ODU3 signal may map to 32 XTP frames. In other words, the payloads of 32 XTP frames may be sufficient to carry the data of a single ODU3 signal.

Figure 8:
FIG. 8 is a diagram illustrating an example of stacking overhead data within XTP frames.

FIG. 8 is a diagram illustrating an example of stacking overhead data within XTP frames. The example of FIG. 8 uses the same example mappings of ODU signals as described with regard to FIG. 7. Thus, in the example illustrated in FIG. 8, an ODU2 signal (shown as ODU2-1) is mapped to 8 XTP frames (shown as XTP1 through XTP8). In other implementations, an ODU2 signal may be mapped to additional or fewer XTP frames.

When the ODU2 signal is mapped to the 8 XTP frames, the overhead data from the ODU signals may be stacked within the XTP frames, similar to the way that labels are stacked in multiprotocol label switching (MPLS) network communications. Assume that the 8 XTP frames include ODU0-1 through ODU0-8 overhead data, ODU1-1 through ODU1-4 overhead data, ODU2-1 overhead data, a portion of ODU3-1 overhead data, and a portion of ODU4-1 overhead data. Additional XTP frames (not shown) may include additional portions of the ODU3-1 overhead data and/or the ODU4-1 overhead data.

For example, the first XTP frame may include ODU0-1 overhead data, a portion of the ODU1-1 overhead data, a portion of the ODU2-1 overhead data, and so on; the second XTP frame may include ODU0-2 overhead data, another portion of the ODU1-1 overhead data, another portion of the ODU2-1 overhead data, and so on; the third XTP frame may include ODU0-3 overhead data, a portion of the ODU1-2 overhead data, another portion of the ODU2-1 overhead data, and so on; the fourth XTP frame may include ODU0-4 overhead data, another portion of the ODU1-2 overhead data, another portion of the ODU2-1 overhead data, and so on; the fifth XTP frame may include ODU0-5 overhead data, a portion of the ODU1-3 overhead data, another portion of the ODU2-1 overhead data, and so on; the sixth XTP frame may include ODU0-6 overhead data, another portion of the ODU1-3 overhead data, another portion of the ODU2-1 overhead data, and so on; the seventh XTP frame may include ODU0-7 overhead data, a portion of the ODU1-4 overhead data, another portion of the ODU2-1 overhead data, and so on; and the eighth XTP frame may include ODU0-8 overhead data, another portion of the ODU1-4 overhead data, another portion of the ODU2-1 overhead data, and so on.

While FIG. 8 shows the ODU overhead data as being appended to the payload of an XTP frame, this is only one possibility. In another implementation, the ODU overhead data may be provided within the frame overhead (OH) of the XTP frame. For example, the ODU overhead data may be provided as the VOH data shown in FIG. 6.

Figure 9:
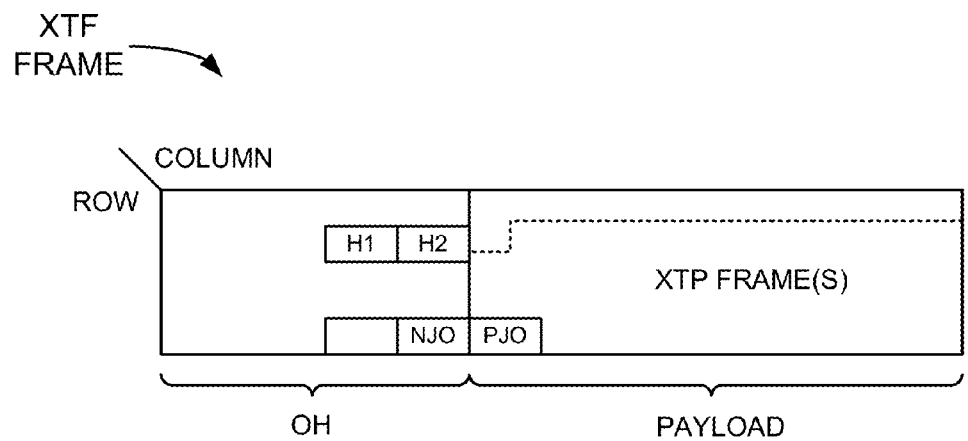
FIG. 9 is a diagram of example data of a switching transport format (XTF) frame.

FIG. 9 is a diagram of example data of an XTF frame. As shown in FIG. 9, an XTF frame may include an overhead (OH) section and a payload section. In another implementation, the XTF frame may include additional or different sections than those shown in FIG. 9. For example, the XTF frame may include a forward error correction (FEC) section that may store data to aid in detecting and correcting errors.

The data of the XTF frame may be arranged as bytes of data in a number of rows and columns. When the XTF frame is transmitted, the data bytes in the first row may be transmitted, followed by the data bytes in the second row, and so forth. Thus, transmission of the XTF frame may include the transmission of overhead data followed by payload data (from the first row), the transmission of overhead data followed by payload data (from the second row), etc.

The overhead section may include data that aids in creation, transmission, performance management, fault management, and/or recovery of data of the XTF frame. In one implementation, the overhead section may include data similar to the data described in ITU-T Recommendation G.709. In addition, the overhead section may include overhead data associated with the super OTU signal. The payload section may include data of an XTP frame. In one implementation, the payload section may include data from a single XTP frame. In another implementation, the payload section may include data from multiple XTP frames.

Since the bit rate of the XTP frame is fixed and the bit rate of the XTF frame is also fixed (though the bit rates are independent of each other and derived from independent clock sources), the XTF frame may use a variable stuff location, but need not use fixed stuff locations. For example, the XTF frame may use a pointer (e.g., offset), shown in FIG. 9 as H1 and H2 data, that identifies the location where the XTP data starts in the payload section. The pointer may permit the overhead section of the XTP frame to be easily located at, for example, intermediate nodes in the network, and may also permit the XTP frames to be deskewed at the egress node before the ODU data is extracted. The XTF frame may use a negative justification opportunity (NJO) and a positive justification opportunity (PJO) as a variable stuff location. The variable stuff location may refer to part of the payload section that may or may not carry data in the XTF frame. A decision may be made, once per XTF frame, whether to include data in the variable stuff location.

Example Processes

In the description to follow, reference will be made to certain operations that may be performed to transmit ODU data of an ODU signal, within a super OTU signal supported by multiple wavelengths, through an optical network from an ingress node (e.g., node 220-1 in FIG. 2) to an egress node (e.g., node 220-8 in FIG. 2) via an intermediate node or nodes (e.g., node 220-3 or node 220-4 in FIG. 2).

Figure 10:
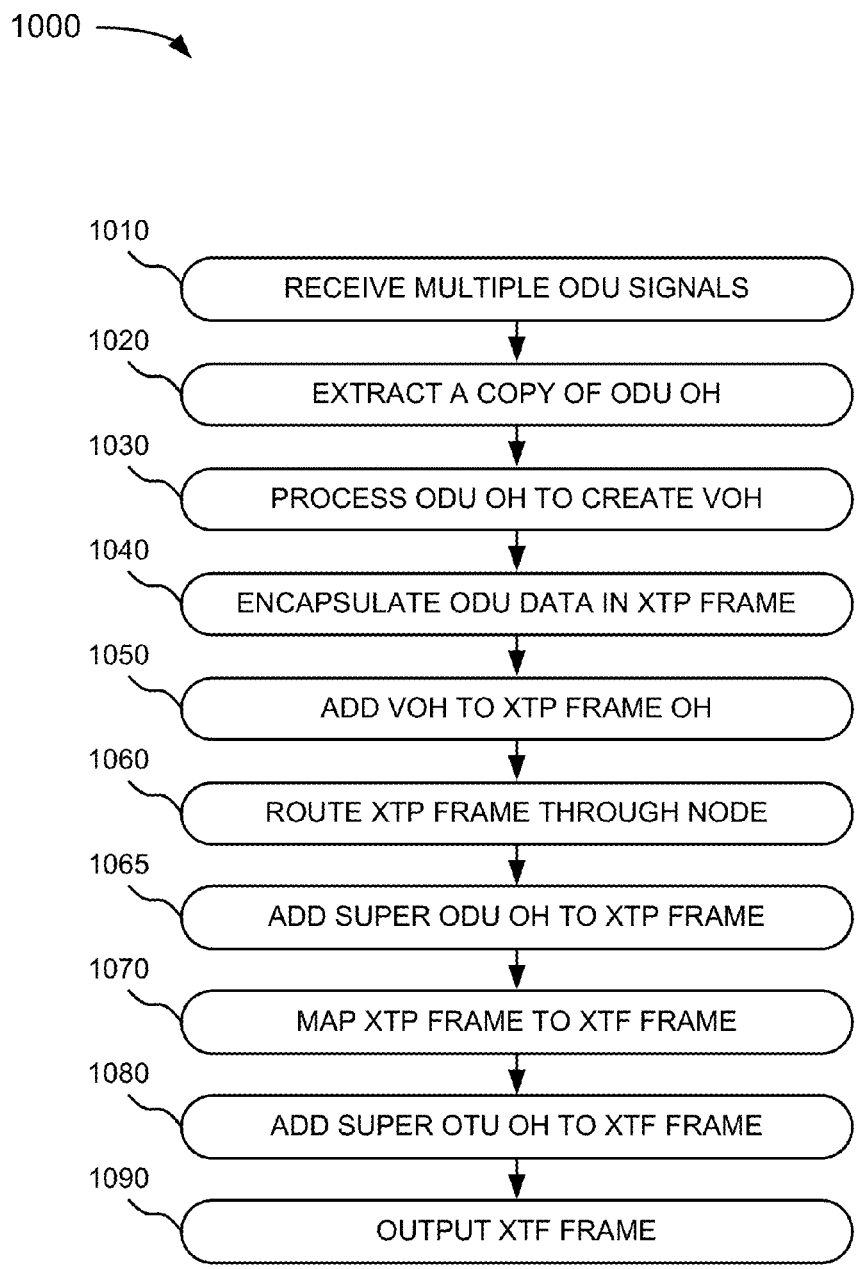
FIG. 10 is a flowchart of an example process for performing dual asynchronous mapping of ODU data of one or more ODU signals at an ingress node.

FIG. 10 is a flowchart of an example process 1000 for performing dual asynchronous mapping of ODU data of multiple ODU signals at an ingress node. Process 1000 may be performed by one or more components within the ingress node.

Process 1000 may include receiving multiple ODU signals (block 1010). For example, a client I/F 410 (or a group of client I/Fs 410), of a tributary module 320 of the ingress node, may receive optical signals on one or more individual wavelengths, and convert the optical signals to a stream of digital data. In one implementation, one or more of the optical signals may correspond to one or more OTN signals (e.g., an ODU client signal encapsulated in an OTU signal). In another implementation, one or more of the optical signals may correspond to one or more client (non-OTN) signals. In this other implementation, client I/F 410 (or another component of the ingress node) may map the one or more client signals to one or more ODU signals. For example, client I/F 410 may provide client overhead and/or client data, of a client signal, in the payload section of an ODU signal.

Process 1000 may include extracting a copy of the overhead data from the ODU signals (block 1020). For example, FM 430 may analyze the ODU signals to identify the ODU overhead data. FM 430 may then make a copy of the ODU overhead data and send the ODU overhead data to virtualization controller 440.

Process 1000 may include processing the ODU overhead data to create VOH data (block 1030). For example, virtualization controller 440 may receive the ODU overhead data and process the ODU overhead data in some manner to form the VOH data. In one implementation, virtualization controller 440 may stack the ODU overhead data in a manner similar to that described above with regard to FIG. 8. In another implementation, virtualization controller 440 may simply use the ODU overhead data as the VOH data. In yet another implementation, virtualization controller 440 may compress the ODU overhead data to form the VOH data. In a further implementation, virtualization controller 440 may process the ODU overhead data in some other manner, such as encoding the ODU overhead data. In still a further implementation, virtualization controller 440 may perform a combination of the above-identified processes to create the VOH data.

Process 1000 may include encapsulating the ODU data in an XTP frame (block 1040). For example, FM 430 may asynchronously map the ODU data into an XTP frame. A single XTP frame may include all or a portion of the ODU data. For an ODU signal with a bit rate over a particular threshold (e.g., greater than approximately 1.31 Gbps), FM 430 may asynchronously map the ODU data into multiple XTP frames (e.g., partition the ODU data into portions (where each portion may fit into the payload of an XTP frame) and map each of the portions into a separate XTP frame).

Process 1000 may include adding the VOH data to the overhead section of the XTP frame (block 1050). For example, FM 430 may receive the VOH data from virtualization controller 440 and insert the VOH data at the appropriate location within the overhead section of one or more XTP frames.

Figure 11A:
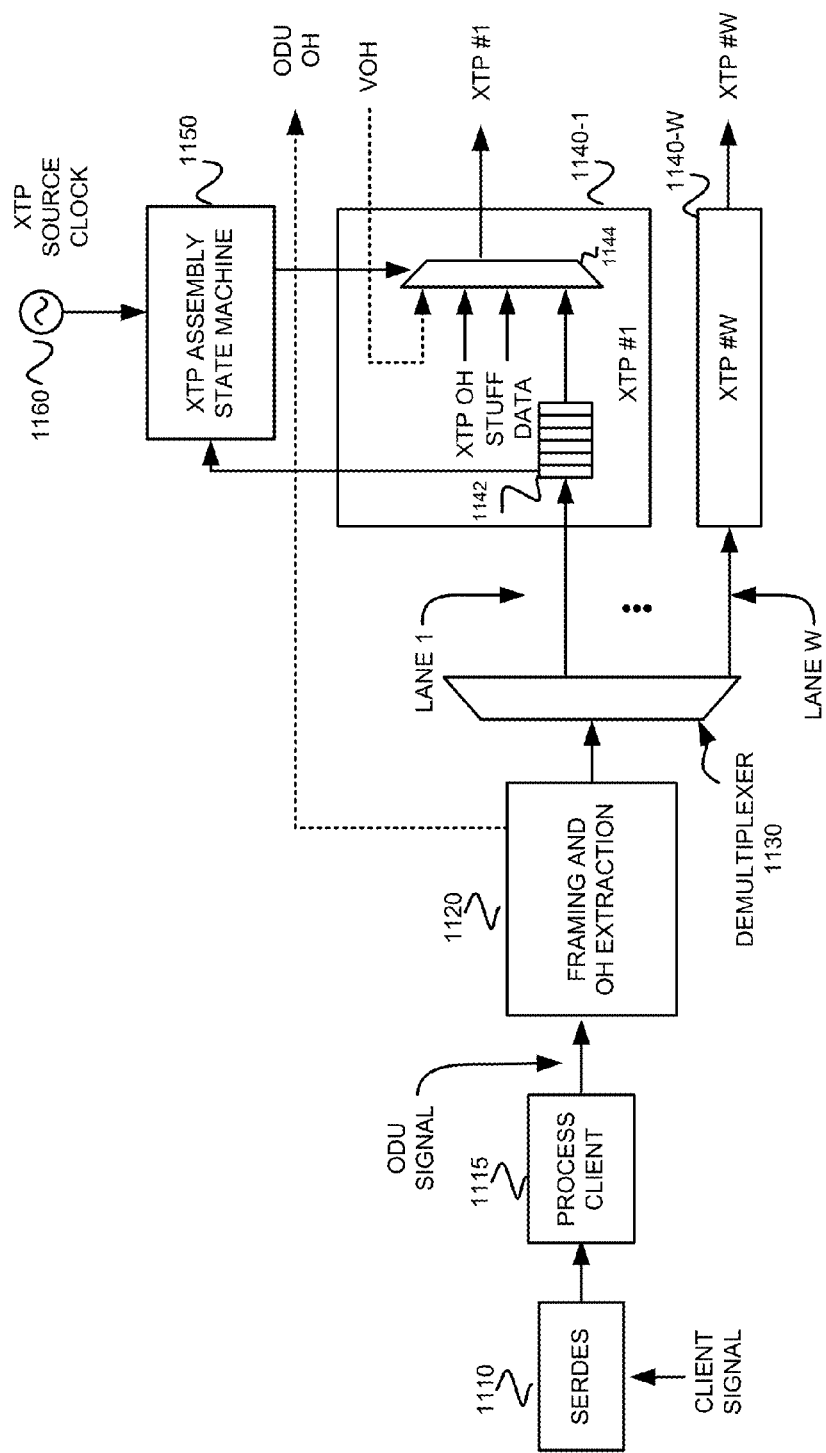
FIG. 11A is a diagram of example functional components for extracting ODU overhead data from one or more ODU signals, asynchronously mapping the one or more ODU signals into multiple XTP frames, and inserting the ODU overhead data and virtual overhead (VOH) data into the overhead section of the XTP frames.

FIG. 11A is a diagram of example functional components for extracting ODU overhead data from ODU data of a group of ODU signals, asynchronously mapping the ODU data into multiple XTP frames, and inserting VOH data into the overhead section of the XTP frames. In one implementation, tributary module 320 may include hardware, or a combination of hardware and software, to implement the functions of the components shown in FIG. 11A. In another implementation, a device separate from, or in combination with, tributary module 320 may perform one or more of the functions described below.

Tributary module 320 may include a serializer/deserializer (SerDes) 1110, a process client component 1115, a framing and overhead (OH) extraction component 1120, a demultiplexer 1130, XTP assembly components 1140-1 through 1140-W (where W≥1), an XTP assembly state machine 1150, and an XTP source clock 1160. XTP assembly component 1140 may include a buffer 1142 and a multiplexer 1144. In another implementation, tributary module 320 may include additional components, fewer components, or different functional components to asynchronously map ODU data of ODU signals into XTP frames.

SerDes 1110 may receive client signal data and synchronously convert the client signal data to parallel format. In one implementation, SerDes 1110 may operate from an externally applied reference that may be some sub-multiple of the bit rate of the client signal data.

Figure 11B:
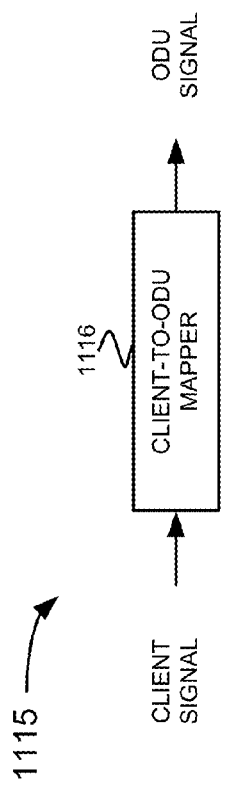
FIG. 11B is a diagram of an example functional component for processing a client signal according to an example implementation.

Process client component 1115 may be configured based on whether the client signal corresponds to a non-OTN client signal or an OTN client signal. FIG. 11B is a diagram of an example functional component for processing a client signal according to an example implementation. In the example of FIG. 11B, assume that the client signal corresponds to a non-OTN client signal, such as an Ethernet signal, a SONET/SDH signal, a Fibre Channel signal, etc. As shown in FIG. 11B, process client component 1115 may include a client-to-ODU mapper component 1116. Client-to-ODU mapper component 1116 may map the non-OTN client signal to one or more ODU signals. Client-to-ODU mapper component 1116 may output the one or more ODU signals.

Figure 11C:
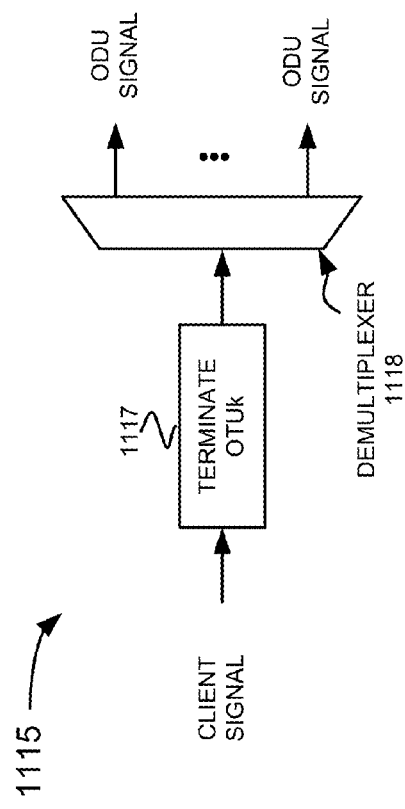
FIG. 11C is a diagram of example functional components for processing a client signal according to another example implementation.

FIG. 11C is a diagram of example functional components for processing a client signal according to another example implementation. In the example of FIG. 11C, assume that the client signal corresponds to an OTN client signal, such as one or more client ODUk signals encapsulated in an OTU signal, such as an OTUk signal. As shown in FIG. 11C, process client component 1115 may include a terminate OTUk component 1117 and a demultiplexer 1118. Terminate OTUk component 1117 may decapsulate an OTUk signal to recover one or more ODUk signals. Demultiplexer 1118 may demultiplex the one or more ODUk signals to recover one or more ODU signals. Demultiplexer 1118 may output the one or more ODU signals.

While FIGS. 11B and 11C show particular functional components for processing a client signal, process client component 1115 may include additional functional components, fewer functional components, or different functional components in other implementations. For example, in one alternative implementation, process client component 1115 may not include demultiplexer 1118. In this alternative implementation, process client component 1115 may output an ODU signal obtained by decapsulating an OTU signal. In another alternative implementation, process client component 1115 may include a framing/descrambling component that may receive the OTN client signal and may perform framing/descrambling operations on the OTN client signal. For example, the framing/descrambling component may recover OTU frame sync (e.g., based on a framing word) and/or may descramble the overhead and payload of the OTU signal.

Framing and OH extraction component 1120 may perform framing operations on the ODU data received from process client component 1115. For example, framing and OH extraction component 1120 may recover ODU frame sync (e.g., based on a framing word). Framing and OH extraction component 1120 may also extract a copy of the overhead data from the ODU data and send the ODU overhead data to virtualization controller 440 (FIG. 4).

Demultiplexer 1130 may receive the ODU data after the framing and descrambling. Demultiplexer 1130 may decompose the ODU data into multiple parts using, for example, byte or word deinterleaving. It may be unnecessary, however, for the ODU data to be aligned to the data path on byte/word boundaries. Demultiplexer 1130 may output the parts of the ODU data on W lanes. Each of the W lanes may be input to a different one of XTP assembly components 1140.

The parts of the ODU data may be forwarded, via the W lanes, to buffers 1142 of XTP assembly components 1140. Buffers 1142 may include elastic buffers, such as first-in, first-out (FIFO) memories, that serve to decouple the ODU signal rate from the bit rate of the XTP frames.

XTP assembly state machine 1150 may asynchronously map each part of the ODU data to the payload area of an XTP frame. XTP assembly state machine 1150 may assemble the individual XTP frames. The XTP bit rate may be driven by a free-running local oscillator (shown as XTP source clock 1160 in FIG. 11A). As described above, for a given nominal ODU signal rate (e.g., the nominal bit rate of each lane, after decomposition), certain defined locations in the XTP frame may always be null and may not contain data. As described above, these locations are called "fixed stuff" locations. The fixed stuff definition may be ODU rate-specific. Additionally, the XTP frame may contain positive and negative justification opportunities (PJOs/NJOs), which may or may not contain data for a given XTP frame. Finally, the XTP frame may include justification control indicators (JCs). The JCs may include flags that indicate whether or not the PJOs/NJOs do or do not contain data for a given XTP frame. To summarize, the fixed stuff locations may essentially define a fixed, ODU-specific nominal bandwidth and the PJOs/NJOs may dynamically adapt to the difference between the actual ODU bit rate and the fixed bit rate of the XTP frame.

XTP assembly state machine 1150 may sequentially assemble each XTP frame by controlling the operation of multiplexer 1144. For example, XTP assembly state machine 1150 may cause multiplexer 1144 to select data derived from buffer 1142, fixed stuff data, XTP overhead data, the justification control indicators, and the VOH data. The VOH data may be received from virtualization controller 440 (FIG. 4).

Fixed stuff locations are ODU rate-specific. During justification opportunities, XTP assembly state machine 1150 may determine whether to insert data or stuff, based on the status of buffer 1142, thereby keeping buffer 1142 from overflowing or underflowing. XTP assembly state machine 1150 may encode the associated justification control indicators to reflect the contents of the justification opportunities. XTP assembly state machine 1150 may insert the VOH data at the appropriate location within the overhead section of an XTP frame. The output of XTP assembly components 1140 may include XTP frames containing the ODU data.

Returning to FIG. 10, process 1000 may include routing the XTP frame through the ingress node (block 1060). For example, FM 430 may segment the XTP frame into switch timeslots and distribute the XTP frame segments on ingress links associated with one or more of switch planes 332. Switches 510 (FIG. 5) may receive the XTP frame segments and identify egress links and timeslots on which to output the XTP frame segments based on the ingress links on which the XTP frame segments are received and the timeslots during which the XTP frame segments are received. Switches 510 may store mapping information that maps a combination of an input timeslot and an ingress link to an output timeslot and an egress link. Switches 510 may route the XTP frame segments accordingly. In one implementation, the XTP frame may be asynchronously mapped into one or more other frames while transporting the XTP frame through the ingress node.

Process 1000 may include adding super ODU overhead data to the XTP frame (block 1065). For example, FM 430, of a line module 310, may multiplex ODU data from one or more XTP frames to form a super ODU signal that will be supported by a super OTU signal. FM 430 may send, to virtualization controller 440, overhead data associated with the super ODU signal.

Virtualization controller 440 may receive the super ODU overhead data and process the super ODU overhead data in some manner to form VOH data. In one implementation, virtualization controller 440 may stack the super ODU overhead data in a manner similar to that described above with regard to FIG. 8. In another implementation, virtualization controller 440 may simply use the super ODU overhead data as the VOH data. In yet another implementation, virtualization controller 440 may compress the super ODU overhead data to form the VOH data. In a further implementation, virtualization controller 440 may process the super ODU overhead data in some other manner, such as encoding the super ODU overhead data. In still a further implementation, virtualization controller 440 may perform a combination of the above-identified processes to create the VOH data. FM 430 may receive the VOH data from virtualization controller 440 and insert the VOH data at the appropriate location within the overhead section of one or more XTP frames.

Process 1000 may include mapping the XTP frame to an XTF frame (block 1070), and adding super OTU overhead data to the XTF frame (block 1080). The mapping of the XTP frame to the XTF frame may be performed asynchronously. As explained above, the XTF frame may be used to transport one or more XTP frames through the optical network in a manner such that the ODU data is transparent to intermediate nodes in the network. One or more XTF frames may carry data of a super OTU signal. The overhead data of the super OTU signal may be added as XTF overhead data within the overhead section of one or more of the XTF frames.

FIG. 12 is a diagram of example functional components for asynchronously mapping an XTP frame into an XTF frame. In one implementation, an egress line module 310 may include hardware, or a combination of hardware and software, to implement the functions of the components shown in FIG. 12. In another implementation, a device separate from, or in combination with, egress line module 310 may perform one or more of the functions described below.

Egress line module 310 may include demultiplexers 1210-1 through 1210-W (collectively referred to as "demultiplexers 1210," and generally as "demultiplexer 1210"), multiplexers 1220-1 through 1220-W (collectively referred to as "multiplexers 1220," and generally as "multiplexer 1220"), and XTF mapping components 1230-1 through 1230-P (where P≤W) (collectively referred to as "XTF mapping components 1230," and generally as "XTF mapping component 1230"). Each XTF mapping component 1230 may include a buffer 1212, an XTP pointer processor 1214, an XTF assembly state machine 1216, and a multiplexer 1218. In another implementation, egress line module 310 may include additional functional components, fewer functional components, or different functional components to asynchronously map an XTP frame to an XTF frame.

Demultiplexer 1210 may receive data of an XTP frame and remove the VOH data from the overhead section of the XTP frame. Demultiplexer 1210 may provide the VOH data to virtualization controller 440. Virtualization controller 440 may process the VOH data and provide the processed VOH data to multiplexer 1220. Multiplexer 1220 may receive the XTP frame from demultiplexer 1210 and the VOH data from virtualization controller 440 and combine them by inserting the VOH data in the appropriate location in the overhead section of the XTP frame. Multiplexer 1220 may provide data of the XTP frame to buffer 1212 of XTF mapping component 1230.

Buffer 1212 may include an elastic buffer, such as a FIFO memory, that receives data of an XTP frame from multiplexer 1220. Buffer 1212 may serve to decouple the bit rate of the XTP frame from the bit rate of the XTF frame. XTP pointer processor 1214 may monitor the XTP pointer to identify the start of the XTP frame within buffer 1212. XTP pointer processor 1214 may recover the XTP overhead data, for monitoring purposes, once the start of the XTP frame is identified. XTP pointer processor 1214 may dynamically adapt for the difference in the bit rate of the XTP frame and the bit rate of the XTF frame using a variable stuff location. As described above, the location at which the XTP starts within the payload of the XTF frame may be identified in the overhead section of the XTF frame.

XTF assembly state machine 1216 may asynchronously map the XTP frame to the payload area of an XTF frame. In one implementation, the XTF frame includes multiple XTP frames. In another implementation, the XTF frame may include a single XTP frame or a portion of an XTP frame. XTF assembly state machine 1216 may operate based on an external clock associated with the optical link transmitter.

XTF assembly state machine 1216 may sequentially assemble each XTF frame by controlling the operation of multiplexer 1218. For example, XTF assembly state machine 1216 may cause multiplexer 1218 to select XTP frame data derived from buffer 1212, the XTP pointer, XTF overhead data in the form of super OTU overhead data, and/or data associated with one or more other XTP frames (which may be output from other buffers 1212 (not shown in FIG. 12)). The output of XTF mapping components 1230 may include XTF frames containing XTP frames.

As shown in FIG. 12, each XTF mapping component 1230 may include a separate XTF assembly state machine 1216. In an alternative implementation, a single XTF assembly state machine 1216 may be used for multiple XTF mapping components 1230.

Figure 13:
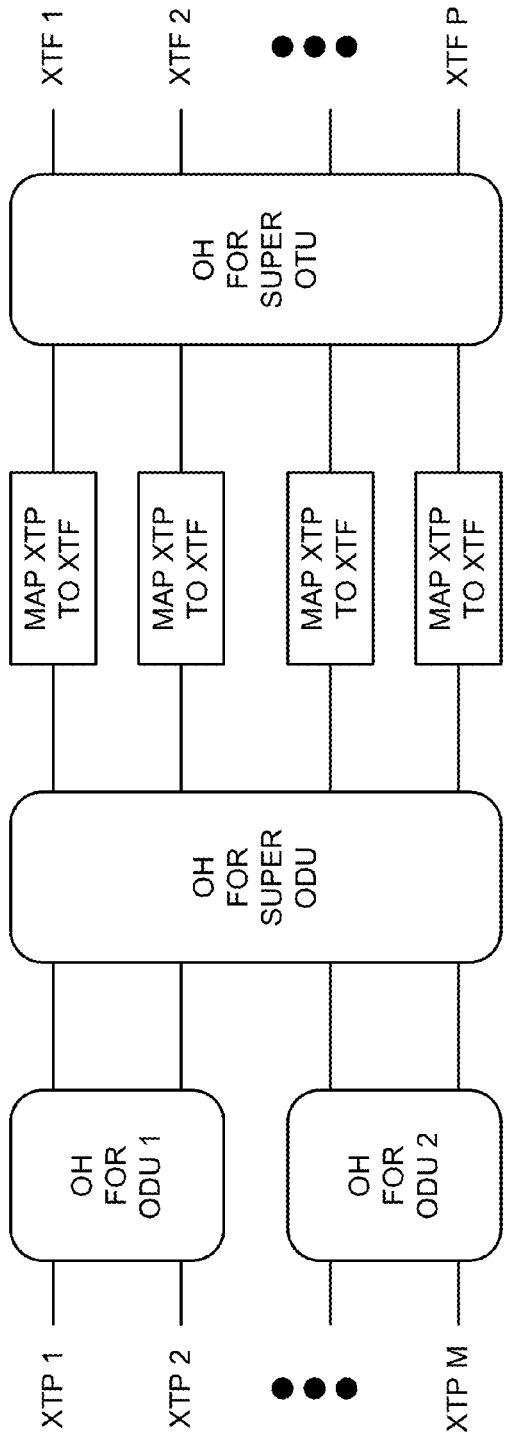
FIG. 13 is a diagram illustrating super OTU overhead data provided within XTF frames.

FIG. 13 is a diagram illustrating super OTU overhead data provided within XTF frames. As shown in FIG. 13, XTP frames may include overhead data from multiple ODU signals (shown as OH for ODU 1 and OH for ODU 2). The overhead data for ODU 1 and the overhead data for ODU 2 could have been added in the same tributary module 320 or in different tributary modules 320. The ODU overhead data may span one or more XTP frames, depending on the bit rate of the ODU signal. As explained above the overhead data may be provided in separate positions (e.g., stacked) in the VOH field. The super ODU overhead data may span one or more XTP frames—potentially all of the XTP frames supported on a line module 310.

The XTP frames may be mapped to XTF frames. As explained above, multiple XTP frames may map to the same XTF frame. Super OTU overhead data may be added, as overhead data, to the overhead section of one or more XTF frames. The super OTU overhead data may span one or more XTF frames—potentially all of the XTF frames supported on a line module 310.

Returning to FIG. 10, process 1000 may include outputting the XTF frame (block 1090). For example, egress line module 310 may transmit the XTF frame on an optical link toward its destination. In one implementation, egress line module 310 may convert each XTF frame to an optical signal, of a particular wavelength, and combine the optical signal with one or more other optical signals, of one or more other XTF frames of one or more other wavelengths, to create a multi-wavelength optical signal that may be transmitted on the optical link. The XTF frames may transit one or more intermediate nodes 220 in the optical network.

While a series of blocks has been described with regard to FIG. 10, the order of the blocks may be modified in other implementations. Further, non-dependent blocks may be performed in parallel. Certain blocks have been described as being performed by particular components of the ingress node. For example, blocks 1010 through 1050 may be performed by one or more components of a tributary module 320, block 1060 may be performed by one or more components of switch fabric 330, and blocks 1065 through 1090 may be performed by one or more components of a line module 310. In another implementation, one or more of these blocks may be performed by a different component of the ingress node.

Figure 14:
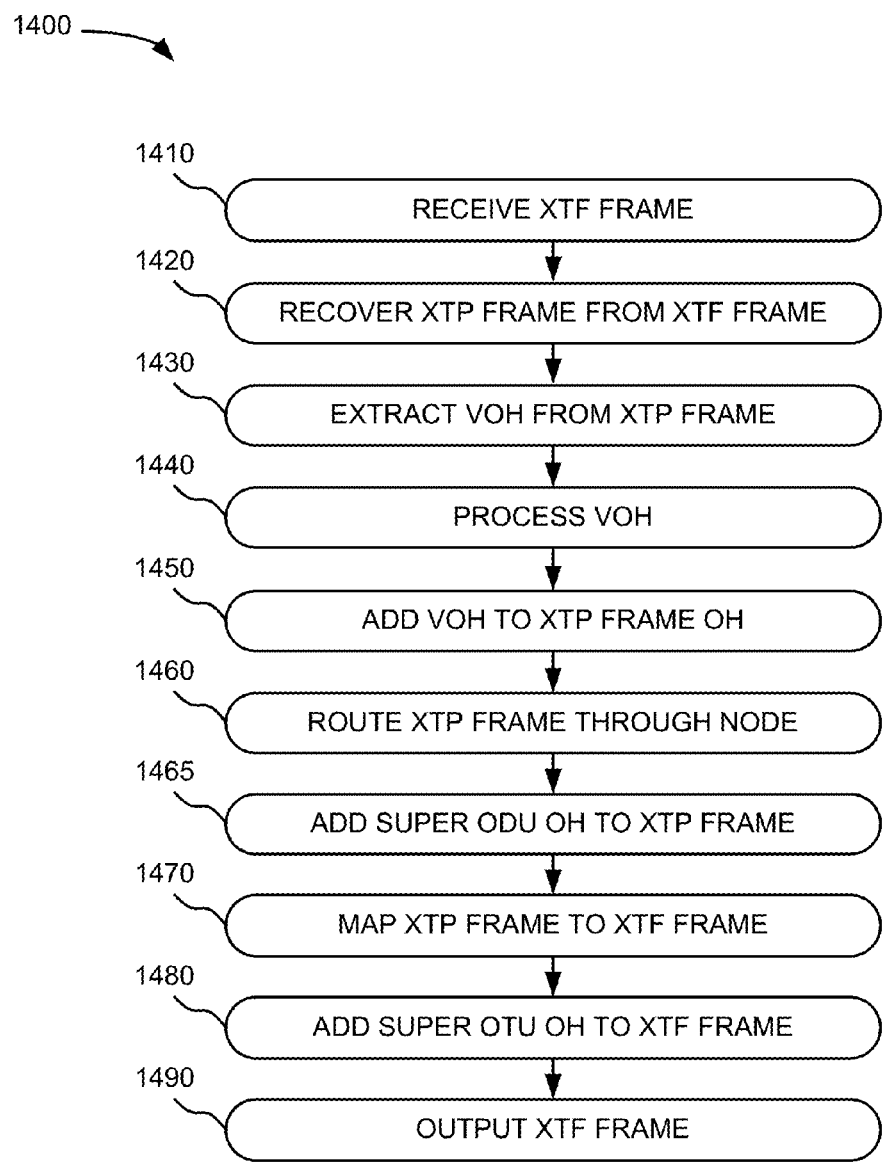
FIG. 14 is a flowchart of an example process for performing asynchronous mapping of an XTP frame at an intermediate node.

FIG. 14 is a flowchart of an example process 1400 for performing asynchronous mapping of an XTP frame at an intermediate node. Process 1400 may be performed by one or more components within the intermediate node.

Process 1400 may include receiving an XTF frame (block 1410). For example, an ingress line module 310, of the intermediate node, may receive a multi-wavelength optical signal, separate the multi-wavelength signal into signals of individual wavelengths, and convert the signals to a stream of digital data, which may represent one or more XTF frames. A FM 430, within ingress line module 310, may receive the stream of data representing an XTF frame.

Process 1400 may include recovering an XTP frame from the XTF frame (block 1420). For example, ingress line module 310 may recover one or more XTP frames from a received XTF frame. In one implementation, as described above, a single XTF frame may include multiple XTP frames. In another implementation, a single XTF frame may include all or a portion of a single XTP frame.

Figure 15:
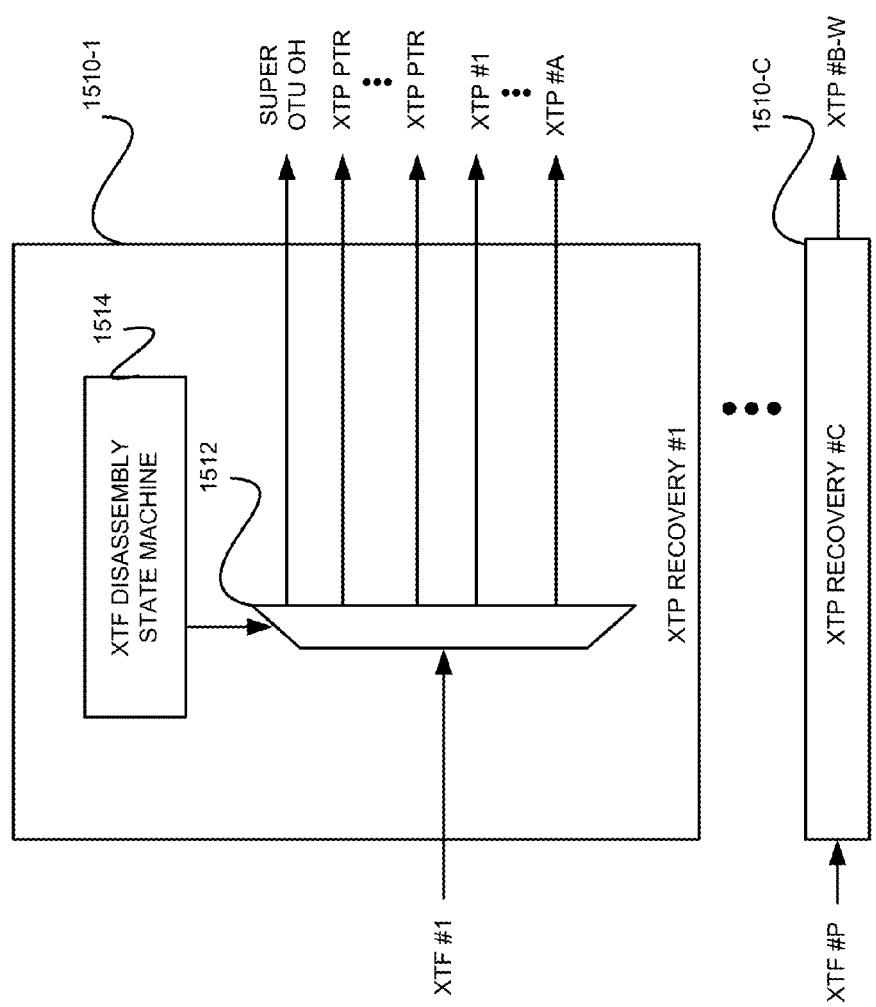
FIG. 15 is a diagram of example functional components for recovering an XTP frame from an XTF frame.

FIG. 15 is a diagram of example functional components for recovering multiple XTP frames from an XTF frame. In one implementation, ingress line module 310 may include hardware, or a combination of hardware and software, to implement the functions of the components shown in FIG. 15. In another implementation, a device separate from, or in combination with, ingress line module 310 may perform one or more of the functions described below.

Ingress line module 310 may include XTP recovery components 1510-1 through 1510-C (referred to collectively as "XTP recovery components 1510," and generally as "XTP recovery component 1510") (where C≥1). Each XTP recovery component 1510 may include a demultiplexer 1512 and an XTF disassembly state machine 1514. In another implementation, ingress line module 310 may include additional, fewer, or different functional components to recover an XTP frame from an XTF frame. For example, in another implementation, each XTP recovery component 1510 may include additional components, such as a framing component, a buffer, and/or an XTP pointer processor to aid in the recovery of the XTP frame. In this situation, the framing component may recover an XTP frame sync (e.g., based on an XTP framing word), the buffer may store the data of an XTP frame and serve to decouple the bit rate of the XTF frame from the bit rate of an XTP frame, and the XTP pointer processor may monitor the data in the buffer to identify the start of the XTP frame and recover the super OTU overhead data.

Demultiplexer 1512 may receive the XTF frame. The operation of demultiplexer 1512 may be controlled by XTF disassembly state machine 1514. XTF disassembly state machine 1514 may recover the XTP frame from the XTF frame. As explained above, in one implementation, the XTF frame includes multiple XTP frames. In another implementation, the XTF frame may include a single XTP frame or a portion of an XTP frame. XTF disassembly state machine 1514 may operate based on an external clock associated with the optical receiver.

XTF disassembly state machine 1514 may recover a group of XTP frames (shown as XTP frame #1 through XTP frame #A) by controlling the operation of demultiplexer 1512. For example, XTF disassembly state machine 1514 may cause demultiplexer 1512 to extract the XTP frames and the super OTU overhead data including the XTP pointers. Each of the XTP pointers may identify a location at which a corresponding XTP frame begins within the payload of the XTF frame.

As shown in FIG. 15, each XTP recovery component 1510 may include a separate XTF disassembly state machine 1514. In an alternative implementation, a single XTF disassembly state machine 1514 may be used for multiple XTP recovery components 1510.

Returning to FIG. 14, process 1400 may extract VOH data from the XTP frame (block 1430). For example, FM 430 may analyze the overhead section of the XTP frame to identify the VOH data. FM 430 may extract the VOH data and send the VOH data to virtualization controller 440.

Process 1400 may include processing the VOH data (block 1440). For example, virtualization controller 440 may process the VOH data in the same manner that virtualization controller 440 would process ODU overhead data if the ODU data was available to the intermediate node, such as performing OTN services (e.g., monitoring all or part of the path used to transport the ODU data, generating overhead (e.g., VOH) data, etc.). Virtualization controller 440 may remove ODU overhead data from the stack, replace ODU overhead data on the stack, and/or add ODU overhead data to the stack. Virtualization controller 440 may provide the processed VOH data to FM 430.

Process 1400 may include adding the VOH data to the overhead section of the XTP frame (block 1450). For example, FM 430 may receive the VOH data from virtualization controller 440 and insert the VOH data at the appropriate location within the overhead section of one or more XTP frames.

Process 1400 may include routing the XTP frame through the intermediate node (block 1460). For example, FM 430 may segment the XTP frame into switch timeslots and distribute the XTP frame segments on ingress links associated with one or more of switch planes 332. Switches 510 (FIG. 5) may receive the XTP frame segments and identify egress links and timeslots on which to output the XTP frame segments based on the ingress links on which the XTP frame segments are received and the timeslots during which the XTP frame segments are received. Switches 510 may store mapping information that maps a combination of an input timeslot and an ingress link to an output timeslot and an egress link. Switches 510 may route the XTP frame segments accordingly. In one implementation, the XTP frame may be asynchronously mapped into one or more other frames while transporting the XTP frame through the intermediate node.

Process 1400 may include adding super ODU overhead data to the XTP frame (block 1465). For example, FM 430, of a line module 310, may multiplex ODU data from one or more XTP frames to form a super ODU signal that will be supported by a super OTU signal. FM 430 may send, to virtualization controller 440, overhead data associated with the super ODU signal.

Virtualization controller 440 may receive the super ODU overhead data and process the super ODU overhead data in some manner to form VOH data. In one implementation, virtualization controller 440 may stack the super ODU overhead data in a manner similar to that described above with regard to FIG. 8. In another implementation, virtualization controller 440 may simply use the super ODU overhead data as the VOH data. In yet another implementation, virtualization controller 440 may compress the super ODU overhead data to form the VOH data. In a further implementation, virtualization controller 440 may process the super ODU overhead data in some other manner, such as encoding the super ODU overhead data. In still a further implementation, virtualization controller 440 may perform a combination of the above-identified processes to create the VOH data. FM 430 may receive the VOH data from virtualization controller 440 and insert the VOH data at the appropriate location within the overhead section of one or more XTP frames.

Process 1400 may include mapping the XTP frame to an XTF frame (block 1470), and adding super OTU overhead to the XTF frame (block 480). As explained above, the XTF frame may be used to transport one or more XTP frames through the optical network in a manner such that the ODU data is transparent to intermediate nodes in the network. One or more XTF frames may carry data of a super OTU signal. The overhead data of the super OTU signal may be added as XTF overhead data within the overhead section of one or more of the XTF frames.

Process 1400 may include outputting the XTF frame (block 1490). For example, egress line module 310 may transmit the XTF frame on an optical link toward its destination. In one implementation, egress line module 310 may convert each XTF frame to an optical signal, of a particular wavelength, and combine the optical signal with one or more other optical signals, of one or more other XTF frames of one or more other wavelengths, to create a multi-wavelength optical signal that may be transmitted on the optical link. The XTF frames may transit one or more intermediate nodes 220 in the optical network before reaching egress node 220.

While a series of blocks has been described with regard to FIG. 14, the order of the blocks may be modified in other implementations. Further, non-dependent blocks may be performed in parallel. Also, as described above, VOH data may be extracted, processed, and added back into the XTP frame prior to routing the XTP frame through the intermediate node. Additionally, or alternatively, VOH data may be extracted, processed, and added back into the XTP frame after routing the XTP frame through the intermediate node. In other words, VOH data may be extracted, processed, and added back into the XTP frame both prior to and after routing the XTP frame through the intermediate node.

Additionally, or alternatively, process 1400 assumed that XTF frames, received by the intermediate node, included super OTU data. In one alternative implementation, the intermediate node may receive XTF frames that do not include super OTU data and output XTF frames that include super OTU data. In this alternative implementation, the intermediate node may perform operations of one or more of the blocks of process 1000 (FIG. 10) relating to forming and/or using a super OTU signal.

Additionally, or alternatively, process 1400 assumed that XTF frames, outputted by the intermediate node, included super OTU data. In one alternative implementation, the intermediate node may receive XTF frames that include super OTU data and transmit XTF frames that do not include super OTU data. In this alternative implementation, the intermediate node may terminate the super OTU signal and form an OTU signal from one or more ODU signals.

Additionally, or alternatively, the intermediate node may perform a combination of the above-identified operations. For example, the intermediate node may receive some XTF frames that include super OTU data and some XTF frames that do not include super OTU data, and/or may output some XTF frames that include super OTU data and some XTF frames that do not include super OTU data.

Figure 16:
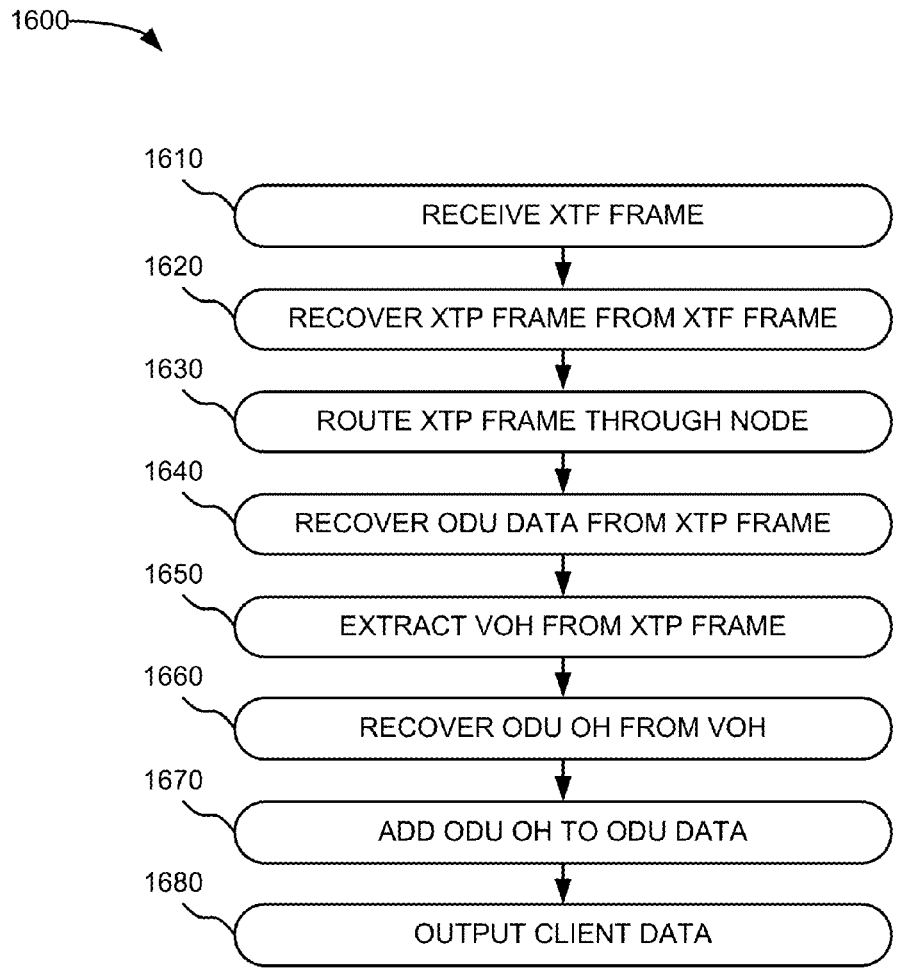
FIG. 16 is a flowchart of an example process for recovering ODU data of one or more ODU signals at an egress node.

FIG. 16 is a flowchart of an example process 1600 for recovering ODU data of an ODU signal at an egress node. Process 1600 may be performed by one or more components within the egress node.

Process 1600 may include receiving an XTF frame (block 1610). For example, an ingress line module 310, of the egress node, may receive a multi-wavelength optical signal, separate the multi-wavelength signal into signals of individual wavelengths, and convert the signals to a stream of digital data, which may represent one or more XTF frames. An FM 430, within ingress line module 310, may receive the stream of data representing an XTF frame.

Process 1600 may include recovering an XTP frame from the XTF frame (block 1620). For example, ingress line module 310 may recover one or more XTP frames from a received XTF frame. In one implementation, as described above, a single XTF frame may include multiple XTP frames. In another implementation, a single XTF frame may include all or a portion of a single XTP frame. In one implementation, ingress line module 310 may perform functions, similar to the functions described above with regard to FIG. 15, to recover the XTP frame from the XTF frame.

Process 1600 may include routing the XTP frame through the egress node (block 1630). For example, FM 430 may segment the XTP frame into switch timeslots and distribute the XTP frame segments on ingress links associated with one or more of switch planes 332. Switches 510 (FIG. 5) may receive the XTP frame segments and identify egress links and timeslots on which to output the XTP frame segments based on the ingress links on which the XTP frame segments are received and the timeslots during which the XTP frame segments are received. Switches 510 may store mapping information that maps a combination of an input timeslot and an ingress link to an output timeslot and an egress link. Switches 510 may route the XTP frame segments accordingly. In one implementation, the XTP frame may be asynchronously mapped into one or more other frames while transporting the XTP frame through the egress node.

Process 1600 may include recovering ODU data from the XTP frame (block 1640). As explained above, the XTP frame may be used to transport all, or a portion, of the ODU data. When multiple XTP frames carry the ODU data, as the XTP frames traverse the optical network, the XTP frames may experience relative skew. Thus, it may be beneficial to deskew the XTP frames and reassemble the XTP frames prior to extracting the ODU data.

Process 1600 may include extracting VOH data from the XTP frame (block 1650). For example, FM 430 may analyze the overhead section of an XTP frame to identify the VOH data. FM 430 may extract the VOH data and send the VOH data to virtualization controller 440.

Process 1600 may include recovering the ODU overhead data from the VOH data (block 1660). For example, virtualization controller 440 may decompress the VOH data to recover the ODU overhead data. Virtualization controller 440 may provide the recovered ODU overhead data to FM 430.

Process 1600 may include adding ODU overhead data to the ODU data (block 1670). For example, FM 430 may provide the recovered ODU overhead data in the ODU overhead section of the ODU data, replacing any data that was originally provided there. In an alternative implementation, FM 430 may analyze and/or process the recovered ODU overhead data and discard the recovered ODU overhead data—leaving the data that was originally provided in the ODU overhead section.

Figure 17A:
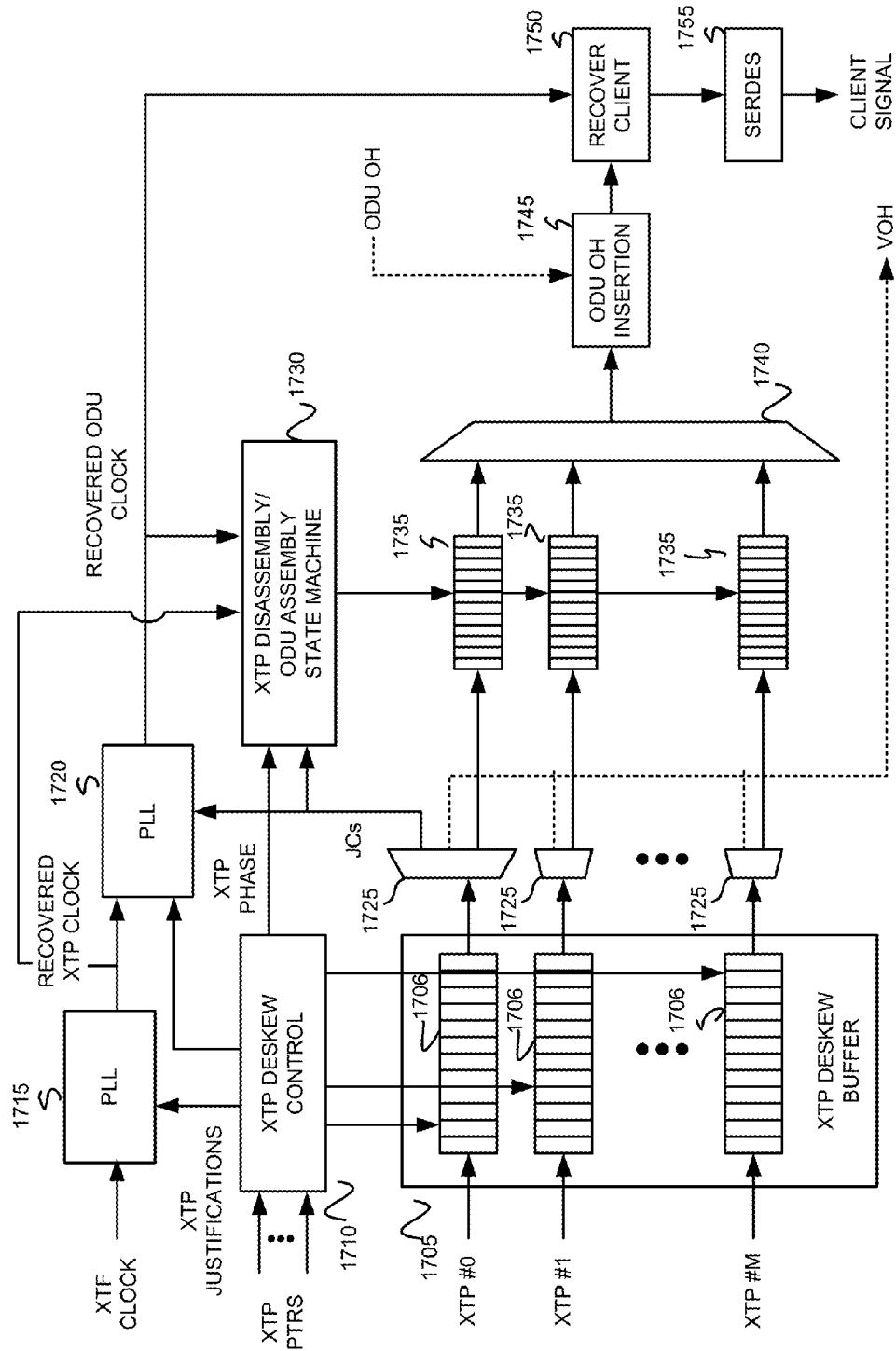
FIG. 17A is a diagram of example functional components for recovering ODU data of one or more ODU signals from an XTP frame, recovering the ODU overhead data from the VOH data, and inserting the recovered ODU overhead data into the ODU data.

FIG. 17A is a diagram of example functional components for recovering ODU data of an ODU signal from multiple XTP frames, recovering the ODU overhead data from the VOH data, and inserting the recovered ODU overhead data into the ODU data. In one implementation, tributary module 320 may include hardware, or a combination of hardware and software, to implement the functions of the components shown in FIG. 17A. In another implementation, a device separate from, or in combination with, tributary module 320 may perform one or more of the functions described below.

Tributary module 320 may include an XTP deskew buffer 1705, XTP deskew control 1710, phase locked loop (PLL) 1715, PLL 1720, demultiplexers 1725, XTP disassembly/ODU assembly state machine 1730, buffers 1735, demultiplexer 1740, ODU overhead (OH) insertion 1745, recover client component 1750, and serializer/deserializer (SerDes) 1755. In another implementation, tributary module 320 may include additional functional components, fewer functional components, or different functional components to recover ODU data from an XTP frame.

In an example operation, XTP deskew buffer 1705 may receive multiple XTP frames (e.g., the XTP frames containing the ODU data). XTP deskew buffer 1705 may include a number of buffers 1706. Buffer 1706 may include an elastic buffer, such as a FIFO memory, that stores an XTP frame.

XTP deskew control 1710 may receive XTP pointers corresponding to the XTP frames. XTP deskew control 1710 may control the storing and outputting of data associated with each of the XTP frames to deskew the XTP frames before the XTP frames are realigned. The implementations, described herein, may support routing of XTP frames over different fiber paths or even different physical paths (i.e., diverse routes) if sufficient deskew buffering is provided at egress node 220.

XTP deskew control 1710 may detect skew using the XTP pointers. The XTP pointer indicates the first byte/word in the XTP structure. Based on detection of the relative XTP phase, XTP deskew control 1710 can realign all of the XTP frames at the egress of XTP deskew buffer 1705.

After realignment, XTP overhead data, including justification control indicators (JCs) and the VOH data, may be extracted via demultiplexers 1725. The portion of the XTP frame containing ODU data may be recovered by extracting fixed stuff locations, and by processing the JCs. Fixed stuff locations may be predefined based on the ODU signal type/bit rate and, therefore, may be known once the XTP frame is delineated. JCs may indicate which of the positive/negative justification opportunities (PJOs/NJOs) in the XTP frame contain data and which are stuffed. Recall that in the ingress node 220 mapping process, justifications of the ODU data into the XTP frame may be done symmetrically on all XTP frames. By extension, all justifications may be processed symmetrically at ingress node 220 from the XTP frame. Therefore, only the JCs from one XTP need to be processed, and only one state machine (e.g., XTP disassembly/ODU assembly state machine 1730) may be needed for XTP decapsulation.

The VOH data may be sent to virtualization controller 440 (FIG. 4) for processing. For example, virtualization controller 440 may decompress the VOH data to recover the ODU overhead data, which may have been modified by one or more nodes 220 during transit of the ODU data within one or more XTP frames.

XTP disassembly/ODU assembly state machine 1730 may reconstruct the ODU data by interleaving the ODU portions, per-XTP, in sequence. XTP disassembly/ODU assembly state machine 1730 may control the operation of buffers 1735 and multiplexer 1740. Buffer 1735 may include an elastic buffer, such as a FIFO memory, that receives portions of the ODU data that have been extracted from the XTP frames. Buffers 1735 may output the ODU data portions to multiplexer 1740. XTP disassembly/ODU assembly state machine 1730 may control multiplexer 1740 to output the ODU data portions so as to interleave the ODU data portions and recover the ODU data.

XTP disassembly/ODU assembly state machine 1730 may operate based on a recovered XTP clock and/or a recovered ODU clock. Two PLLs 1315 and 1320 may be used to recover the ODU clock. PLL 1715 may receive, as input, the XTF clock signal and XTP justifications, and output the recovered XTP clock. PLL 1720 may receive the XTP clock signal and information regarding XTP justifications to recover the ODU clock signal. The ODU clock signal may be used by XTP disassembly/ODU assembly state machine 1730 to recover the ODU data. In another implementation, the ODU clock may be generated in another manner, such as from a free-running clock.

Once the ODU data is recovered, the ODU overhead data may be inserted by ODU overhead insertion component 1745. ODU overhead insertion component 1745 may receive the recovered ODU overhead data from virtualization controller 440. In one implementation, ODU overhead insertion component 1745 may replace the original ODU overhead data in the ODU data with the recovered ODU overhead data. In another implementation, ODU overhead insertion component 1745 may discard the recovered ODU overhead data and retain the original ODU overhead data in the ODU data. In either implementation, ODU overhead insertion component 1745 may modify, if necessary, the original or recovered ODU overhead data prior to inserting the ODU overhead data into the ODU data.

Recover client component 1750 may be configured based on whether the client signal corresponds to a non-OTN client signal or an OTN client signal. FIG. 17B is a diagram of an example functional component for recovering a client signal according to an example implementation. In the example of FIG. 17B, assume that the client signal corresponds to a non-OTN client signal, such as an Ethernet signal, a SONET/SDH signal, a Fibre Channel signal, etc. As shown in FIG. 17B, recover client component 1750 may include an ODU-to-client demapper component 1751. ODU-to-client demapper component 1751 may recover the non-OTN client signal from one or more ODU signals. ODU-to-client demapper component 1751 may output a non-OTN client signal.

FIG. 17C is a diagram of example functional components for recovering a client signal according to another example implementation. In the example of FIG. 17C, assume that the client signal corresponds to an OTN client signal. As shown in FIG. 11C, recover client component 1750 may include multiplexer 1752 and a create OTUk component 1753. Multiplexer 1752 may multiplex one or more ODU signals to one or more ODUk signals. Multiplexer 1752 may output the one or more ODUk signals. Create OTUk component 1753 may encapsulate one or more ODUk signals in an OTU signal, such as an OTUk signal. Create OTUk component 1753 may output the OTN client signal in the form of an OTUk signal.

While FIGS. 17B and 17C show particular functional components for recovering a client signal, recover client component 1750 may include additional functional components, fewer functional components, or different functional components in other implementations. For example, in one alternative implementation, recover client component 1750 may not include multiplexer 1752. In this alternative implementation, recover client component 1750 may receive an ODU signal and encapsulate the ODU signal in an OTU signal.

SerDes 1755 may receive the client signal data, from recover client component 1750, and synchronously serialize the client signal data for transmission by SerDes 1755.

Returning to FIG. 16, client data may be output (block 1680). For example, in one implementation, as described above, tributary module 320 may encapsulate the ODU data in an OTU signal, convert the OTU signal to an optical signal of a particular wavelength, and output the OTU data to a client 210. Alternatively, tributary module 320 may combine the wavelength containing the OTU data with wavelengths containing other OTU data to generate a multi-wavelength optical signal, and send the multi-wavelength optical signal to client 210. In another implementation, tributary module 320 may extract client data from the ODU data. In this implementation, tributary module 320 may convert the client data to an optical signal of a particular wavelength and output the client data to a client 210. Alternatively, tributary module 320 may combine the wavelength containing the client data with wavelengths containing other client data to generate a multi-wavelength optical signal, and send the multi-wavelength optical signal to client 210.

While a series of blocks has been described with regard to FIG. 16, the order of the blocks may be modified in other implementations. Further, non-dependent blocks may be performed in parallel. Certain blocks have been described as being performed by particular components of the egress node. For example, blocks 1610 and 1620 may be performed by one or more components of a line module 310, block 1630 may be performed by one or more components of switch fabric 330, and blocks 1640 through 1680 may be performed by one or more components of a tributary module 320. In another implementation, one or more of these blocks may be performed by a different component of the egress node.

Also, as described above, VOH data may be extracted and the ODU overhead data being recovered after routing the XTP frame through the egress node. Additionally, or alternatively, VOH data may be extracted and the ODU overhead data may be recovered prior to routing the XTP frame through the egress node. In other words, operations relating to extracting VOH data and recovering the ODU overhead data may be performed both prior to and after routing the XTP frame through the egress node.

Example

Figure 18:
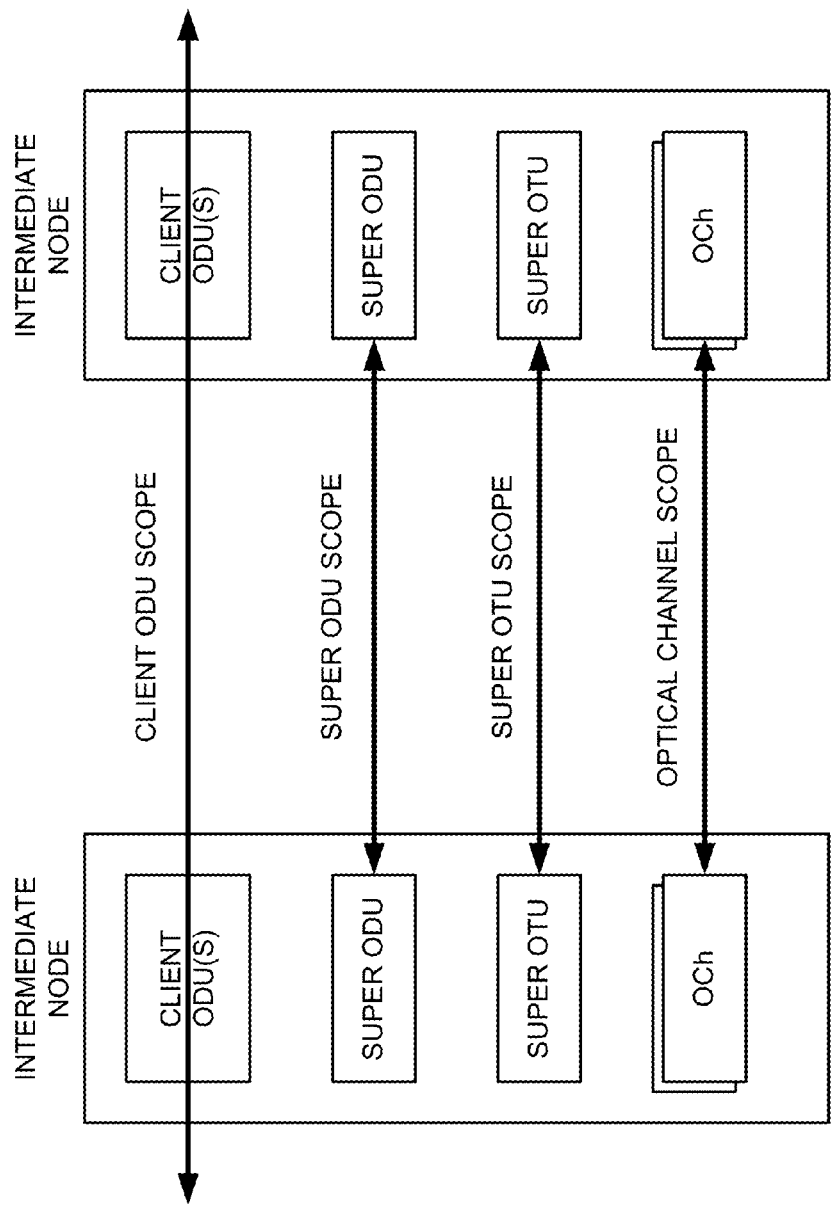
FIG. 18 is a diagram of an example of transporting ODU data within a super OTU between intermediate nodes in an optical network.

FIG. 18 is a diagram of an example of transporting ODU data within a super OTU between intermediate nodes in an optical network. FIG. 18 shows a simplified, conceptual view of a portion of an optical network that includes two intermediate nodes. The term "scope" is intended to define the extent of a layer in the optical network, and is defined by the termination points at which the layers are originated and terminated in the optical network.

As shown in FIG. 18, four layers are presented: a client ODU layer, a super ODU layer, a super OTU layer, and an optical channel layer. These different layers exist on both of the intermediate nodes in the optical network. Client ODU signals are transmitted via the client ODU layer. The client ODU scope, of the client ODU layer, may extend along all of the nodes in a path of the optical network. Super ODU signals are transmitted via the super ODU layer. The super ODU scope, of the super ODU layer, may extend between the two intermediate nodes. Super OTU signals are transmitted via the super OTU layer. The super OTU scope, of the super OTU layer, may extend between the two intermediate nodes. The optical channel scope may extend between the two intermediate nodes, and may include M different wavelengths.

Figure 19:
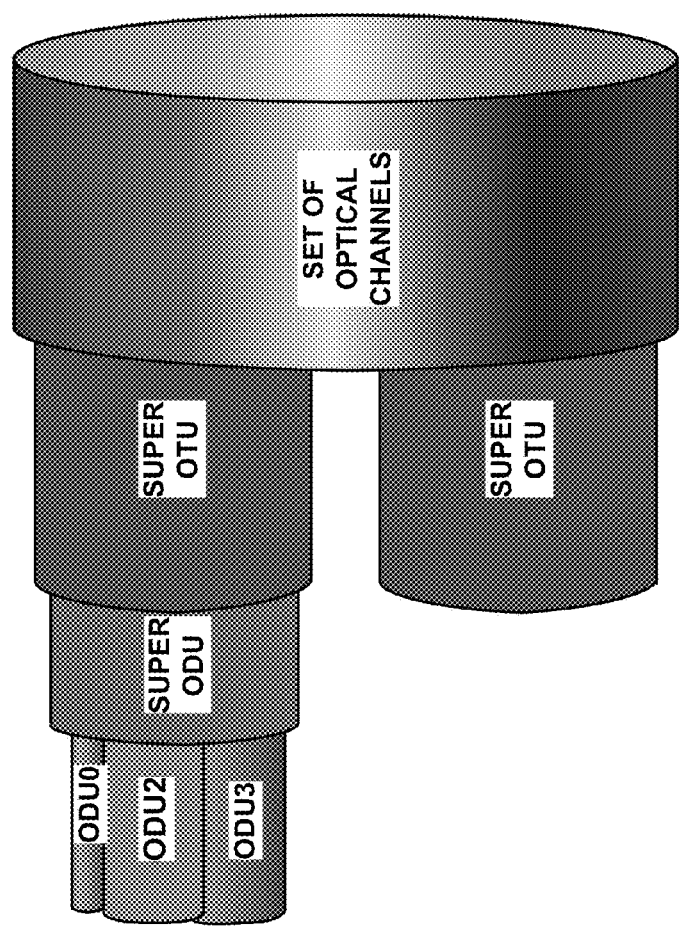
FIG. 19 is a diagram of ODU signals and OTU signals that may be transported on a set of optical channels of different wavelengths.

FIG. 19 is a diagram of ODU signals and OTU signals that may be transported on a set of one or more optical channels that supports multiple wavelengths. As shown in FIG. 19, multiple ODU signals may be encapsulated within a super ODU signal. The super ODU signal may be encapsulated within a super OTU signal. The super OTU signal may be transmitted on a set of one or more optical channels that support multiple wavelengths. In other words, data of super OTU signal may be supported by multiple wavelengths. The bit rate of the super OTU signal may be based on a sum of the bit rates associated with the wavelengths. The bit rate of the super ODU signal may be proportional to the bit rate of the super OTU signal.

CONCLUSION

Implementations described herein may facilitate the communication of ODU data within a super OTU signal that is supported by multiple, different wavelengths in an optical network.

The foregoing description provides illustration and description, but is not intended to be exhaustive or to limit the implementations to the precise form disclosed. Modifications and variations are possible in light of the above disclosure or may be acquired from practice of the implementations.

For example, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network, comprising:
 a plurality of nodes, one of the plurality of nodes being configured to:
  receive a plurality of first optical channel data unit (ODU) signals;
  encapsulate one or more of the plurality of first ODU signals into a second ODU signal;
  encapsulate the second ODU signal into an optical channel transport unit (OTU) signal; and
  transmit a plurality of optical channels, each of the plurality of optical channels having a corresponding one of a plurality of wavelengths, the plurality of optical channels carrying the OTU signal, each of the plurality of optical channels having a corresponding one of a plurality of bit rates,
   where a bit rate of the OTU signal is based on a sum of the plurality of bit rates of the plurality of optical channels, and
   where a bit rate of the second ODU signal is proportional to the bit rate of the OTU signal.

2. The network of claim 1, where the second ODU signal includes an ODU overhead section that includes ODU overhead data associated with at least one of the one or more of the first plurality of ODU signals, and an ODU payload section that includes ODU data associated with at least one of the one or more of the first plurality of ODU signals,
 where the one of the plurality of nodes is further configured to:
  map the ODU data into a frame, the frame including a frame overhead section and a frame payload section, the frame payload section including at least a portion of the ODU data; and
  provide at least a portion of the ODU overhead data in the frame overhead section of the frame, and output the frame on one of the plurality of optical channels.

3. The network of claim 2, where, when providing at least a portion of the ODU overhead data in the frame overhead section of the frame, the one of the plurality of nodes is configured to:
stack ODU overhead data, associated with at least two of the one or more of the plurality of first ODU signals, within the frame overhead section of the frame.

4. The network of claim 2, where the frame is a first frame, the frame overhead section is a first overhead section, and the frame payload section is a first payload section, the one of the plurality of nodes is further configured to map the first frame into a second frame, the second frame including a second overhead section and a second payload section, the second payload section including the first frame, and where, when outputting the first frame, the one of the plurality of nodes is configured to output the second frame that includes the first frame.

5. The network of claim 4, where a bit rate of the first frame and a bit rate of the second frame are independent of each other.

6. The network of claim 4, where the second frame includes data from a plurality of frames, where the plurality of frames includes the first frame.

7. The network of claim 4, where the second frame includes data from the OTU signal, and
where, when transmitting the OTU signal, the one of the plurality of nodes is configured to transmit the second frame on one of the plurality of optical channels.

8. The network of claim 1, where, when receiving the plurality of first ODU signals, the one of the plurality of nodes is configured to:
receive a client OTU signal, and
decapsulate the client OTU signal to recover one of the plurality of first ODU signals.

9. The network of claim 1, where, when receiving the plurality of first ODU signals, the one of the plurality of nodes is configured to:
receive a client signal from a client, and
map the client signal into one of the first plurality of ODU signals.

10. The network of claim 1, where the one of the plurality of nodes is further configured to:
map ODU data, of the second ODU signal, into a first frame; and
map the first frame into a second frame, where the second frame includes overhead data associated with the OTU signal, and
where, when transmitting the OTU signal, the one of the plurality of nodes is configured to output the second frame on one of the plurality of optical channels.

11. A method performed in a network that includes a plurality of nodes, the method comprising:
receiving a plurality of first optical channel data unit (ODU) signals;
multiplexing the plurality of first ODU signals into a second ODU signal,
where a bit rate of the second ODU signal is greater than a bit rate of one or more of the plurality of first ODU signals;
encapsulating the second ODU signal into an optical channel transport unit (OTU) signal; and
transmitting the OTU signal on a plurality of optical channels,
where each of the plurality of optical channels has a corresponding one of a plurality of wavelengths, the plurality of optical channels carrying the OTU signal,
where each of the plurality of optical channels has a corresponding one of a plurality of bit rates, and
where a bit rate of the OTU signal is related to a sum of the plurality of bit rates of the plurality of optical channels.

12. The method of claim 11, where the second ODU signal includes an ODU overhead section that includes ODU overhead data associated with at least one of the one or more of the first plurality of ODU signals, and an ODU payload section that includes ODU data associated with at least one of the one or more of the first plurality of ODU signals,
where the method further comprises:
mapping the ODU data into a frame, the frame including a frame overhead section and a frame payload section, the frame payload section including at least a portion of the ODU data,
providing at least a portion of the ODU overhead data in the frame overhead section of the frame, and
outputting the frame on one of the plurality of optical channels.

13. The method of claim 12, where providing at least a portion of the ODU overhead data in the frame overhead section of the frame includes:
stacking ODU overhead data, associated with at least two of the plurality of first ODU signals, within the frame overhead section of the frame.

14. The method of claim 12, where the frame is a first frame, the frame overhead section is a first overhead section, and the frame payload section is a first payload section, and
where the method further comprises:
mapping the first frame into a second frame, the second frame including a second overhead section and a second payload section, the second payload section including at least a portion of the first frame, and
where outputting the first frame includes outputting the second frame that includes the at least a portion of the first frame.

15. The method of claim 14, where the second frame includes data from the OTU signal, and
where transmitting the OTU signal includes transmitting the second frame on one of the plurality of optical channels.

16. The method of claim 11, where receiving the plurality of first ODU signals includes:
receiving a client OTU signal, and
decapsulating the client OTU signal to recover one of the plurality of first ODU signals.

17. The method of claim 11, where receiving the plurality of first ODU signals includes:
receiving a client signal from a client, and
mapping the client signal into one of the first plurality of ODU signals.

18. The method of claim 11, further comprising:
mapping ODU data, of the second ODU signal, into a first frame; and
mapping the first frame into a second frame, where the second frame includes overhead data associated with the OTU signal, and
where transmitting the OTU signal includes outputting the second frame on one of the plurality of optical channels.

* * * * *